(12) United States Patent
Han et al.

(10) Patent No.: US 11,144,173 B2
(45) Date of Patent: Oct. 12, 2021

(54) ELECTRONIC DEVICE AND METHOD FOR PROVIDING OBJECT RECOMMENDATION

(71) Applicant: Samsung Electronics Co., Ltd., Gyeonggi-do (KR)

(72) Inventors: Min-Seok Han, Seoul (KR); Sun-A Kim, Seoul (KR); Min-Jin Rho, Seoul (KR); Min-Shik Sohn, Seoul (KR); Sang-Gon Song, Gyeonggi-do (KR); Seung-A Lee, Busan (KR)

(73) Assignee: Samsung Electronics Co., Ltd

( * ) Notice: Subject to any disclaimer, the term of this patent is extended or adjusted under 35 U.S.C. 154(b) by 16 days.

(21) Appl. No.: 15/774,209

(22) PCT Filed: Nov. 7, 2016

(86) PCT No.: PCT/KR2016/012747
§ 371 (c)(1),
(2) Date: May 7, 2018

(87) PCT Pub. No.: WO2017/078500
PCT Pub. Date: May 11, 2017

(65) Prior Publication Data
US 2018/0329607 A1    Nov. 15, 2018

(30) Foreign Application Priority Data
Nov. 5, 2015    (KR) .......................... 10-2015-0155357

(51) Int. Cl.
*G06F 3/0481*    (2013.01)
*G06F 16/16*    (2019.01)
(Continued)

(52) U.S. Cl.
CPC ........ *G06F 3/04817* (2013.01); *G06F 3/0482* (2013.01); *G06F 3/0484* (2013.01);
(Continued)

(58) Field of Classification Search
CPC ............ G06F 3/04817; G06F 3/04886; G06F 3/0482; G06F 3/04883; G06F 16/00; G06F 16/168; G06F 3/0484; H04L 67/34
See application file for complete search history.

(56) References Cited

U.S. PATENT DOCUMENTS 7,739,604 B1 *   6/2010  Lyons ................... G06F 3/0486
                                                        709/213
2005/0190196 A1 *  9/2005  O'Neil .................. G06F 3/0238
                                                        345/589
(Continued)

FOREIGN PATENT DOCUMENTS

CN    102591942    7/2012
CN    103309559    9/2013
(Continued)

OTHER PUBLICATIONS

PCT/ISA/210 Search Report issued on PCT/KR2016/012747 (pp. 3).
(Continued)

*Primary Examiner* — Daniel W Parcher
(74) *Attorney, Agent, or Firm* — The Farrell Law Firm, P.C.

(57) ABSTRACT

The present invention relates to an electronic device and a method for providing an object recommendation. Electronic devices according to various embodiments each comprise: a display; and a processor, wherein the processor can be configured to receive a request for generating a folder comprising a first object displayed on the display, search for at least one object recommendation on the basis of first information associated with the first object in response to the request, and display the searched at least one object recommendation. Also, other embodiments are possible.

4 Claims, 26 Drawing Sheets

(51) Int. Cl.
  *G06F 3/0488* (2013.01)
  *G06F 3/0482* (2013.01)
  *G06F 3/0484* (2013.01)
  *G06F 16/00* (2019.01)
  *H04L 29/08* (2006.01)

(52) U.S. Cl.
  CPC ...... *G06F 3/04883* (2013.01); *G06F 3/04886* (2013.01); *G06F 16/00* (2019.01); *G06F 16/168* (2019.01); *H04L 67/34* (2013.01)

(56) References Cited

U.S. PATENT DOCUMENTS

| | | | |
|---|---|---|---|
| 2009/0248615 A1* | 10/2009 | Drory | G06F 16/16 |
| 2010/0257482 A1 | 10/2010 | Lyons et al. | |
| 2011/0246918 A1* | 10/2011 | Henderson | G06F 3/04817 |
| | | | 715/769 |
| 2013/0063613 A1* | 3/2013 | Conwell | G06K 9/32 |
| | | | 348/207.99 |
| 2013/0132896 A1 | 5/2013 | Lee et al. | |
| 2013/0198029 A1* | 8/2013 | Mowatt | G06Q 10/10 |
| | | | 705/26.7 |
| 2013/0290369 A1* | 10/2013 | Sayers | H04L 67/22 |
| | | | 707/769 |
| 2013/0311946 A1 | 11/2013 | Kwon | |
| 2014/0019484 A1* | 1/2014 | Coppin | G06F 16/5838 |
| 2014/0101617 A1 | 4/2014 | Yang et al. | |
| 2014/0181751 A1 | 6/2014 | Won et al. | |
| 2014/0201681 A1 | 7/2014 | Mahaffey et al. | |
| 2014/0215367 A1 | 7/2014 | Kim et al. | |
| 2014/0298271 A1* | 10/2014 | Jakubiak | G06F 3/04883 |
| | | | 715/856 |
| 2015/0058766 A1* | 2/2015 | Wang | G06F 3/0482 |
| | | | 715/765 |
| 2015/0106737 A1 | 4/2015 | Montoy et al. | |
| 2016/0110069 A1* | 4/2016 | Tanoue | G06F 3/0482 |
| | | | 715/845 |
| 2016/0140447 A1* | 5/2016 | Cohen | G06N 5/02 |
| | | | 706/52 |
| 2016/0170579 A1* | 6/2016 | Li | G06F 3/0482 |
| | | | 715/778 |

FOREIGN PATENT DOCUMENTS

| | | |
|---|---|---|
| CN | 103713843 | 4/2014 |
| CN | 103970414 | 8/2014 |
| CN | 104007891 | 8/2014 |
| CN | 104391621 | 3/2015 |
| CN | 104965630 | 10/2015 |
| KR | 101233955 | 2/2013 |
| KR | 1020130056672 | 5/2013 |
| KR | 1020130059738 | 6/2013 |
| KR | 1020140082000 | 7/2014 |
| KR | 1020150120608 | 10/2015 |

OTHER PUBLICATIONS

PCT/ISA/237 Written Opinion issued on PCT/KR2016/012747 (pp. 6).

Chinese Office Action dated Jul. 15, 2021 issued in counterpart application No. 201680064625.1, ,24 pages.

\* cited by examiner

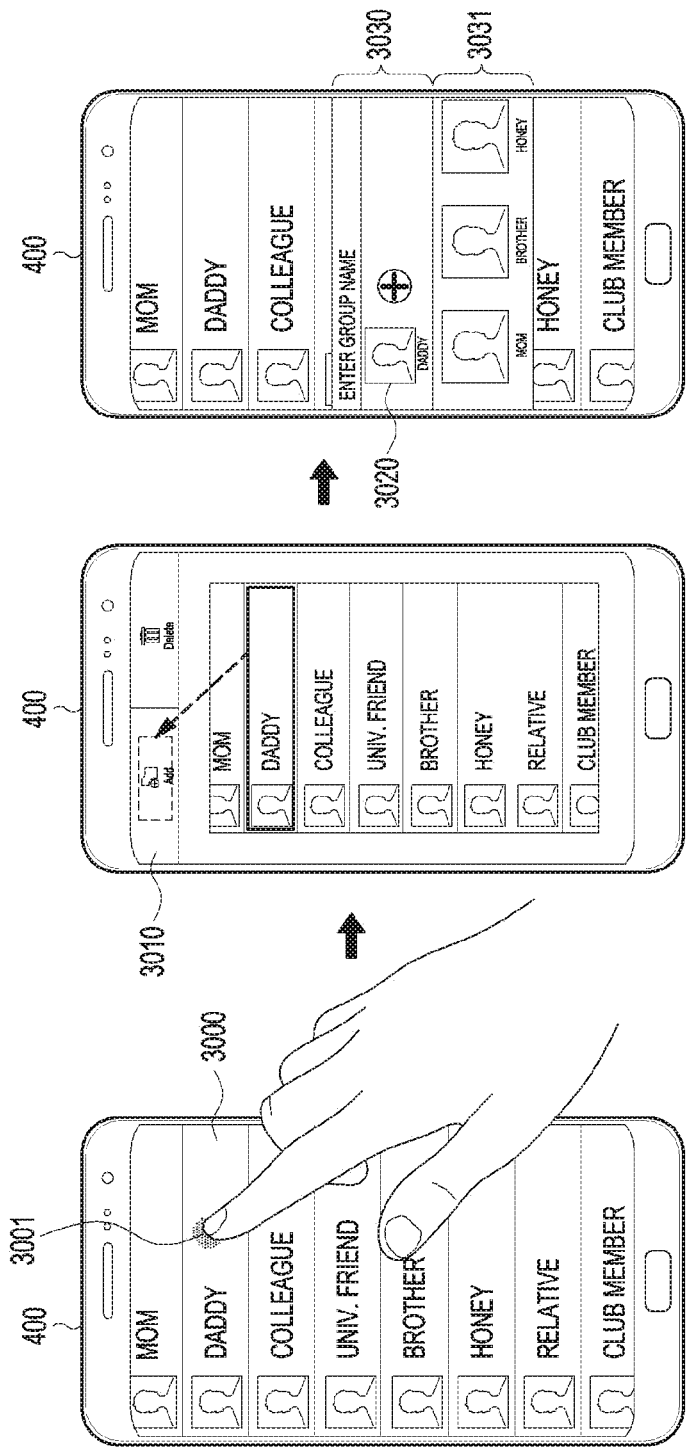

US 11,144,173 B2

ELECTRONIC DEVICE AND METHOD FOR PROVIDING OBJECT RECOMMENDATION

PRIORITY

This application is a National Phase Entry of International Application No. PCT/KR2016/012747, which was filed on Nov. 7, 2016, and claims priority to Korean Patent Application No. 10-2015-0155357, which was filed on Nov. 5, 2015, the contents of each of which are incorporated herein by reference.

BACKGROUND

1. Field

Various embodiments of the present invention relate to recommending a relevant object upon creating a folder for an object, such as an application, photo, sound source, or contact.

2. Description of the Related Art

Generally, smartphones or mobile terminals may offer various object services by downloading and installing application programs or applications and executing installed application programs or applications.

To create a folder including a plurality of applications installed on a mobile terminal, the mobile terminal may display a user interface for creating a folder upon receipt of a request for creating a folder, and if a plurality of applications are chosen to be included upon creating a folder, the mobile terminal may create a folder including the plurality of applications chosen.

SUMMARY

Such conventional mobile terminals repeat the operation of choosing applications to be included in a folder upon creating the folder, consuming significant time.

Further, the user classifies, searches, and then chooses applications when creating a folder, and this may be burdensome.

Recently, more attention is drawn to methods for allowing users to create folders containing objects, such as photos, sound sources, or contacts, in an easier and more convenient way.

Therefore, a need exists for a method for providing a recommended object related to at least one object contained in a folder upon creating the folder.

According to various embodiments of the present invention, there are provided an electronic device and method for providing recommended objects.

To achieve the above objectives, according to various embodiments of the present invention, an electronic device comprises a display and a processor, wherein the processor may be configured to receive a request for creating a folder including a first object displayed on the display, search for at least one recommended object based on first information associated with the first object in response to the received request, and display the at least one recommended object searched for.

To achieve the above objectives, according to various embodiments of the present invention, a method for providing a recommended object by an electronic device comprises receiving a request for creating a folder including a first object displayed on a display, searching for at least one recommended object based on first information associated with the first object in response to the received request, and displaying the at least one recommended object searched for.

According to various embodiments of the present invention, upon creating a folder containing an object, at least one recommended object related to the object may be provided, allowing the user to create a folder for the objects in an easier and more convenient way.

BRIEF DESCRIPTION OF THE DRAWINGS

FIG. 30 illustrates examples of operations for providing a recommended contact based on first information about a first contact upon creating a folder including the first contact according to various embodiments.

DETAILED DESCRIPTION

Figure 1:
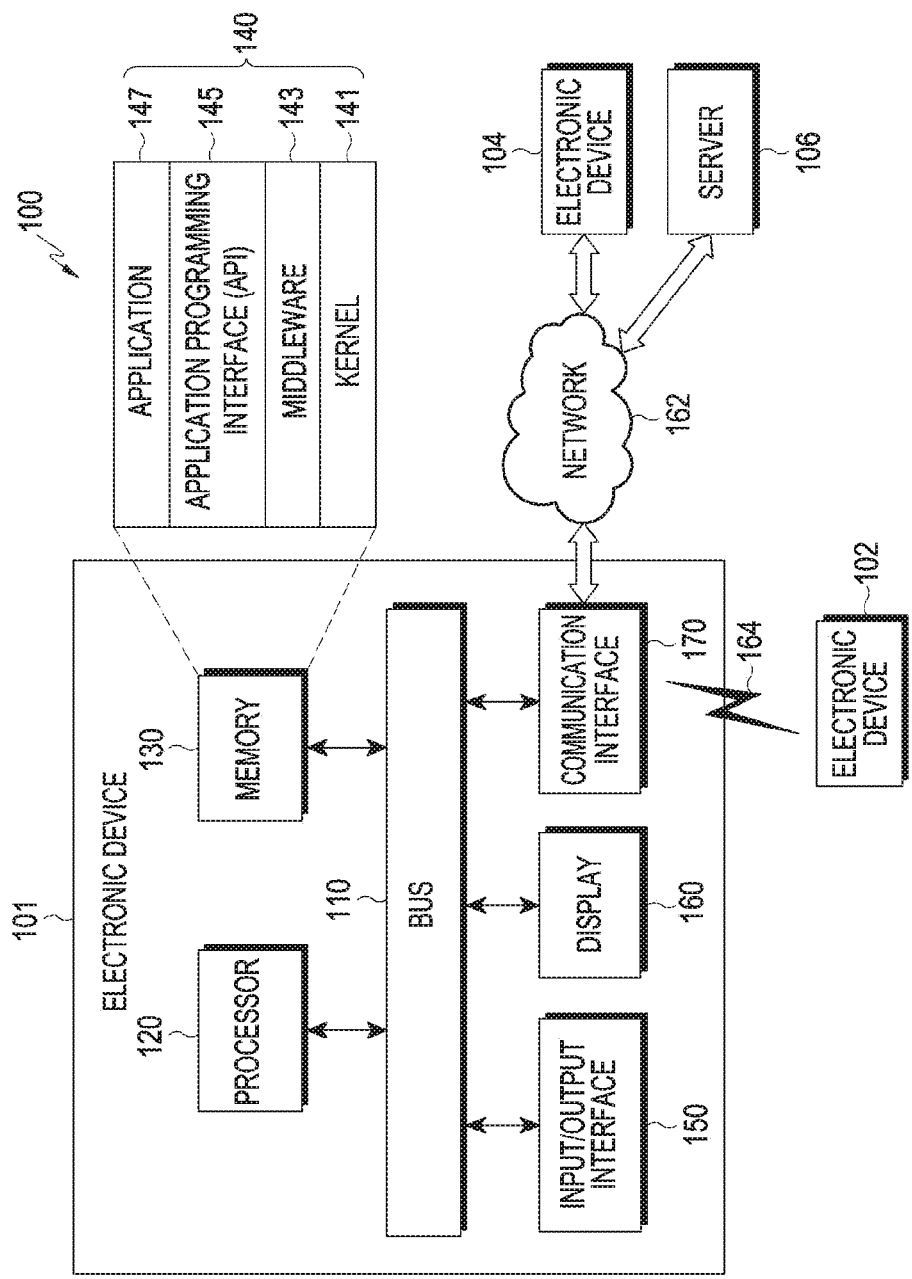
FIG. 1 illustrates a network environment including an electronic device according to various embodiments.

Hereinafter, various embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to various embodiments, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to another embodiment, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, electronic or gas meters, a sprinkler, a fire alarm, a thermostat, a street light, a toaster, fitness equipment, a hot water tank, a heater, or a boiler).

According to some embodiments, examples of the electronic device may at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication. The processor 120 may be denoted a controller, or the processor 120 may include a controller as part thereof or may configure the controller.

The memory 130 may include a volatile and/or non-volatile memory. For example, the memory 130 may store commands or data related to at least one other component of the electronic device 101.

According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, near-field communication (NFC), or GNSS. The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101.

According to an embodiment, the server 106 may include a group of one or more servers.

According to various embodiments, all or some of operations executed on the electronic device 101 may be executed on another or multiple other electronic devices (e.g., the electronic devices 102 and 104 or server 106).

According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
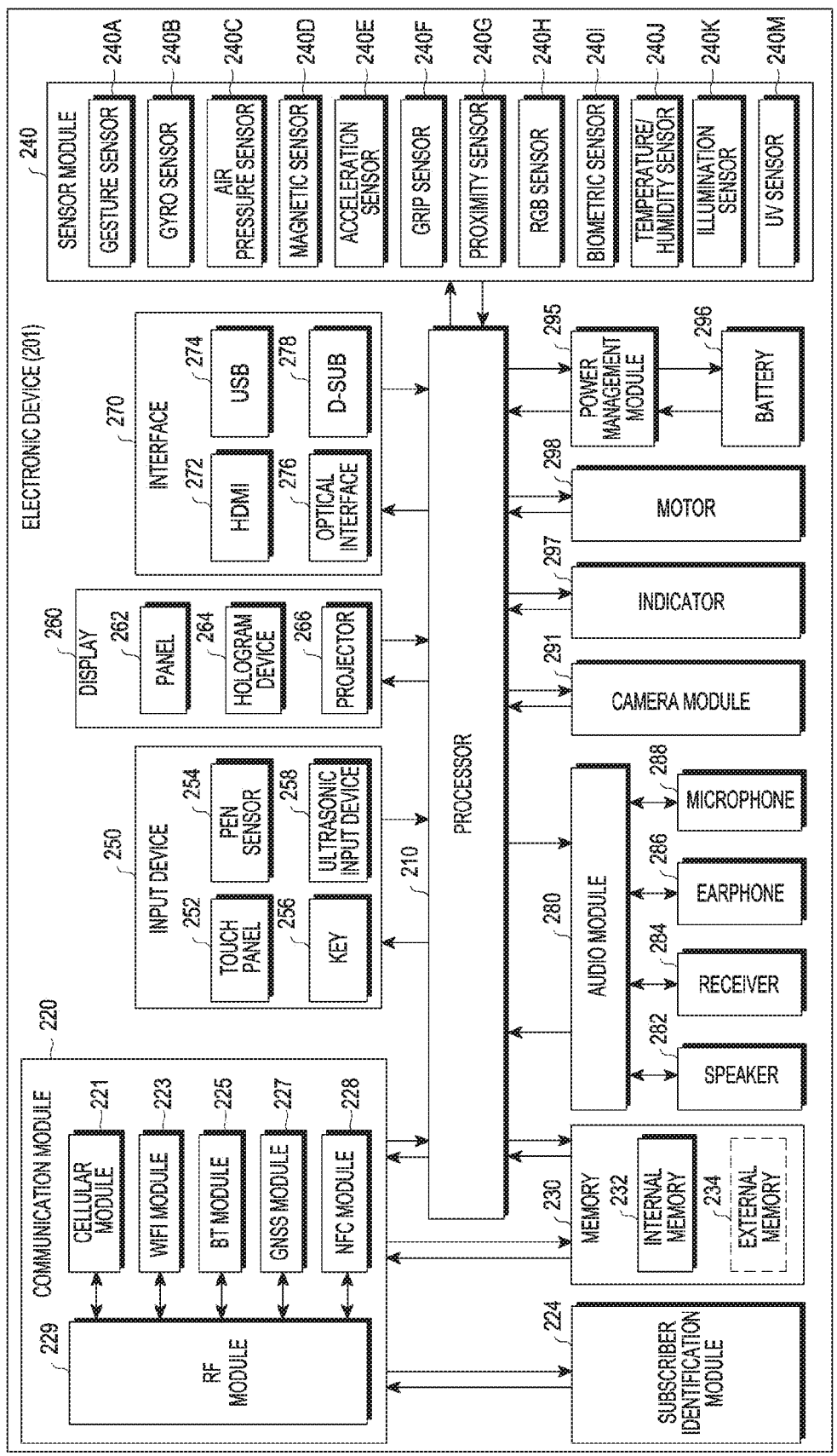
FIG. 2 is a block diagram illustrating an electronic device according to various embodiments.

FIG. 2 is a block diagram illustrating an electronic device according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). The processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP).

The Wi-Fi module 223, the Bluetooth module 225, the GNSS module 227, or the NFC module 228 may include a process for, e.g., processing data communicated through the module. According to some embodiments, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to some embodiments, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258.

The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment, one or more image sensors (e.g., front and back sensors), a lens, an Image signal processor (ISP), or a flash such as an LED or xenon lamp.

The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or media-Flo™.

Each of the aforementioned components of the electronic device may include one or more parts, and a name of the part may vary with a type of the electronic device. The electronic device in accordance with various embodiments of the present disclosure may include at lest one of the aforementioned components, omit some of them, or include other additional component(s). Some of the components may be combined into an entity, but the entity may perform the same functions as the components may do.

Figure 3:
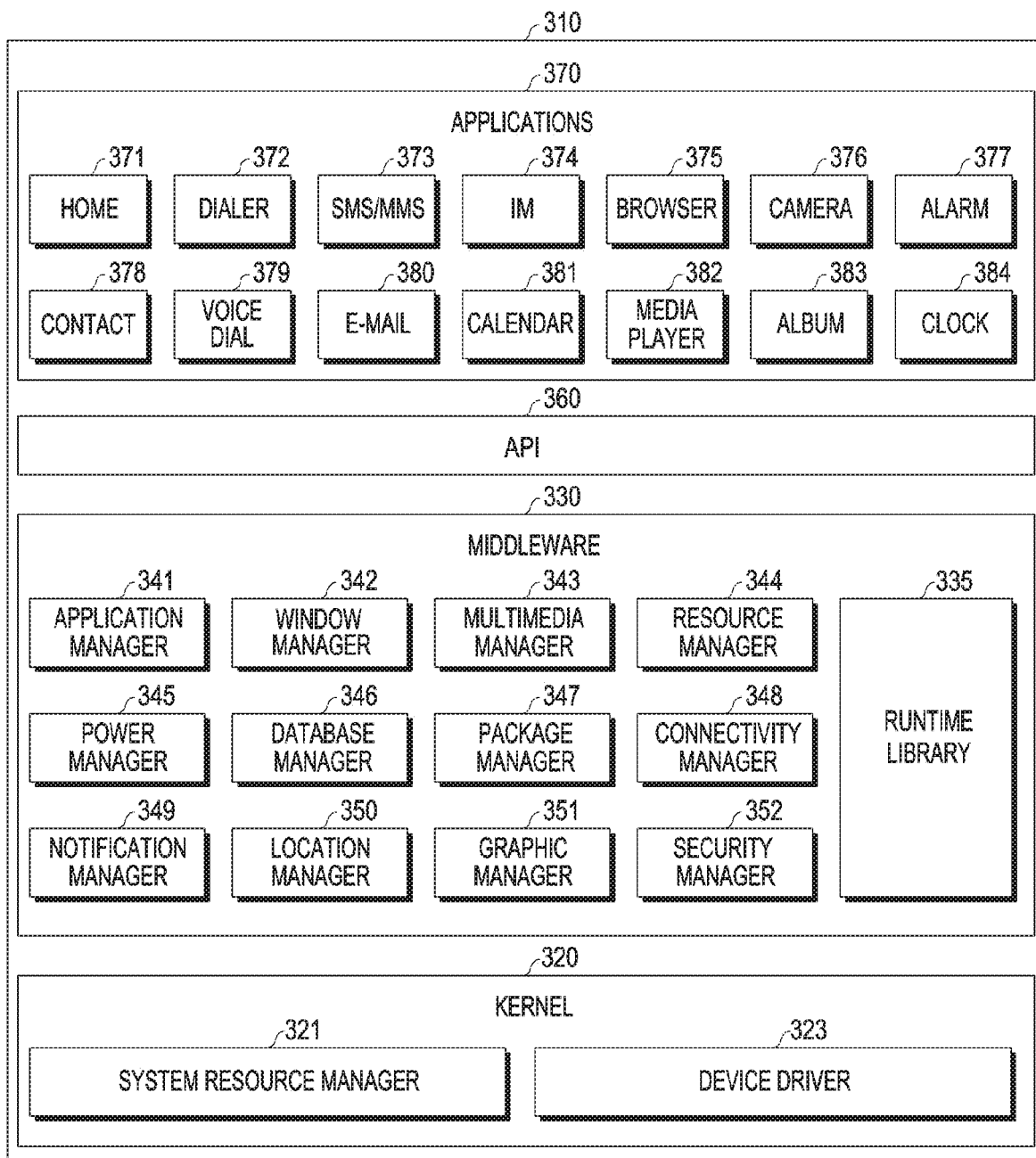
FIG. 3 is a block diagram illustrating a program module according to various embodiments.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android®, iOS®, Windows®, Symbian®, Tizen®, or Bada™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provided a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android® or iOS®, one API set may be provided per platform, and in the case of Tizen™, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a heath-care (e.g., measuring the degree of workout or blood sugar), or provision of environmental information (e.g., provision of air pressure, moisture, or temperature information).

According to an embodiment, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment, the application 370 may include an application (e.g., a health-care application of a mobile medical device) designated according to an attribute of the external electronic device (e.g., the electronic devices 102 and 104). According to an embodiment, the application 370 may include an application received from the external electronic device (e.g., the server 106 or electronic devices 102 and 104). According to an embodiment, the application 370 may include a preloaded application or a third-party application downloadable from a server. The names of the components of the program module 310 according to the shown embodiment may be varied depending on the type of operating system.

According to various embodiments, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of commands, process, or the like for performing one or more functions.

Figure 4:
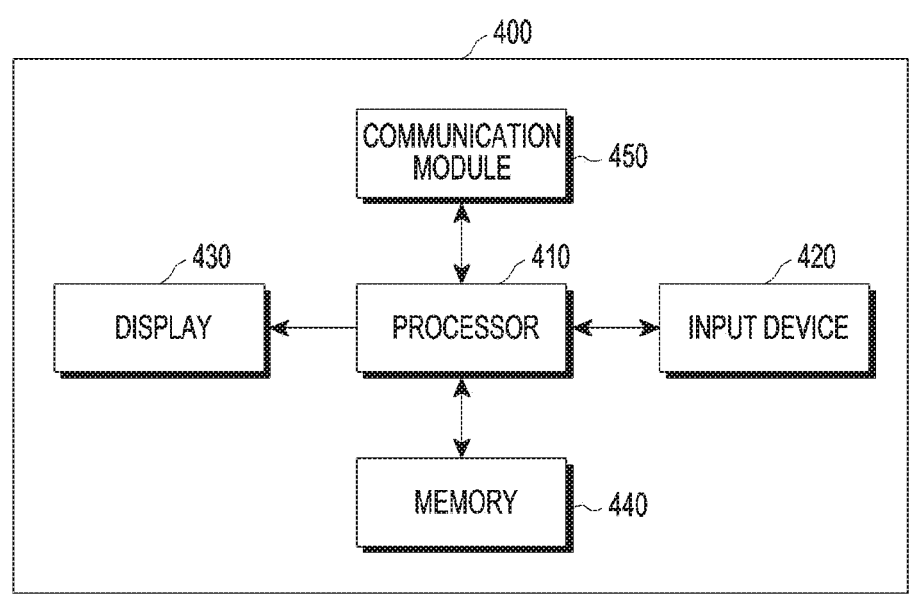
FIG. 4 is a view illustrating a configuration of an electronic device according to various embodiments.

FIG. 4 is a view illustrating a configuration of an electronic device according to various embodiments.

Referring to FIG. 4, an electronic device 400 may include a processor 410, an input device 420, a display 430, a memory 440, and a communication module 450.

The processor 410 may control the overall operation of the input device 420, the display 430, the memory 440, and the communication module 450.

According to an embodiment, the processor 410 may receive a request for creating a folder including a first object, search for at least one recommended object based on first information about the first object in response to the received request, and display, through the display 430, the at least one recommended object searched for. Here, the first object may include an application, a photo, a sound source, or contact. The first information may include all information about an application, photo, sound source, or contact used to search for a recommended application, recommended photo, recommended sound source, or recommended contact.

Where the first object is an application, upon receipt of a request for creating a folder including an execution icon for executing a first application among at least one application installed on the electronic device 101, the processor 410 may search for at least one recommended application based on the first information about the first application and may display, through the display 430, an execution icon for the at least one recommended application searched for.

According to an embodiment, where the input device 420 is a touch panel, upon receipt of a long touch for the execution icon for the first application, the processor 410 may shrink the home screen displayed on the display 430 and display an input area for creating a new folder in an upper end of the home screen. If the execution icon long touched is dragged to the input area, the processor 410 may determine it as a request for creating a folder including the execution icon of the first application.

According to an embodiment, upon receipt of, e.g., a touch input or key input for creating a folder through the input device 420, the processor 410 may display, through the display 430, a selection screen for selecting at least one application to be included in the folder. If the icon of the first application is selected through the input device 420, the processor 410 may determine it as a request for creating a folder including the execution icon of the first application.

An information set for the first application may include categories for the first application, search information about the first application, folder information about at least one user who use the first application, and additional information including information about icon colors, icon shapes, and the developer of the first application.

According to an embodiment, the processor 410 may deliver, to the server 106, attribute information corresponding to information about, e.g., name, category name, use frequency, and an application associated with the first application, receive search information associated with the first application from the server 106, and search for at least one recommended application based on the received search information. The attribute information may include all text related to the first application, e.g., download count, description, or reviews.

Upon receipt of the attribute information from the electronic device 400, the server 106 may search for an application associated with the first application, use frequency, category name, or name through a search engine equipped in the server 106 and transfer search information corresponding to the result of search to the electronic device 400. The search information may include results of lexical search through the search engine on text, such as name, category name, use frequency, and application associated with the first application.

For example, where the name of the first application is "S Heath," the processor 410 may deliver "S Heath" to the server 106. The server 106 may search for text associated with "S Heath" through the search engine, and where the text searched for is "Heath, LifeLogger," the server 106 may deliver "Heath, LifeLogger" to the electronic device 400. Having received the search information, the processor 120 may search for at least one recommended application associated with "Heath, LifeLogger" based on the search information.

The at least one application searched for may include, e.g., applications with "Heath, LifeLogger" in their name, applications with "Heath, LifeLogger" in their category name, applications with "Heath, LifeLogger" in their description, and applications with "Heath, LifeLogger" in their reviews.

According to an embodiment, the processor 120 may send a request for folder information about similar users corresponding to a similar age group or the same gender as the user of the electronic device 400 among users using the first application to the server 106 and search for at least one recommended application based on folder information received from the server 106.

The server 106 may gather and store folder information about the users using the first application, and upon receipt of the request for folder information about the similar users from the electronic device 400, the server 106 may search for similar users corresponding to a similar age group and the same gender as the user of the electronic device 400. The server 106 may deliver, to the electronic device 400, folder information about similar users creating a folder including the first application among similar users searched for.

The folder information may include application information about other applications included in a folder including similar applications to the first application, e.g., applications corresponding to the same category or applications having the same name, as well as the folder including the first application.

According to an embodiment, the processor 410 may search for at least one recommended application based on additional information, such as the folder name entered through the input device 420, developer or carrier, icon shape, or icon color for the first application.

For example, the processor 410 may search for at least one recommended application having an icon color corresponding to the icon color of the first application. The processor 410 may compare a representative color value for the icon colors of the applications installed on the electronic device 400 with a representative color value for the icon color of the first application and search for at least one recommended application corresponding to the difference in representative color value being less than a threshold. The representative color value may be a color value that most of pixels constituting the icon have among the color values of the pixels.

For example, the processor 410 may identify the icon shape of the first application and search for at least one recommended application having an icon shape corresponding to the identified icon shape. Where the icon shape of the first application is a circle, the processor 410 may search for at least one recommended application with a circular icon shape among the applications installed on the electronic device 400.

For example, the processor 410 may identify the developer of the first application and search for at least one recommended application developed by the identified developer.

For example, upon receipt of a folder name through the input device 420, the processor 410 may search for at least one recommended application related to the received folder name Where the received folder name is "transportation," the processor 410 may search for at least one recommended application with "transportation" in their name, category name, description, or reviews.

Although an example in which the processor 410 searches for at least one recommended application based on each first information piece about the first application has been described above, the processor 410 may also search for recommended applications using at least one of the first information pieces or sequentially using the first information pieces.

If the execution icon of the second application is selected among the execution icons of the at least recommended application displayed, the processor 410 may include the selected execution icon of the second application in the folder including the execution icon of the first application.

According to an embodiment, where the first object is a photo, upon receipt of a request for creating a folder including a first photo, the processor 410 may search for at least one recommended photo based on first information about the first photo and display the at least one recommended photo searched for through the display 430. The processor 410 may display thumbnail images for at least one recommended photo.

The first information about the first photo may include the file name of the first photo, the created date of the first photo, location information measured upon creating the first photo, the background color of the first photo, and object information extractable and recognizable from the first photo.

For example, where the file name of the first photo is "sky," the processor 410 may search for at least one recommended photo whose file name is "sky."

For example, where the date of creation of the first photo is "2015-10-27," the processor 410 may search for at least one recommended photo whose date of creation is "2015-10-27."

For example, the location information about the first photo is "home," the processor 410 may search for at least one recommended photo whose location information is "home."

For example, the object information extractable or recognizable from the first photo is "human," the processor 410 may search for at least one recommended photo whose object information is "human."

If a second photo is selected among the at least one recommended photo displayed, the processor 410 may include the second photo in the folder including the first photo.

According to an embodiment, where the first object is a sound source, upon receipt of a request for creating a folder including a first sound source, the processor 410 may search for at least one recommended sound source based on first information about the first sound source and display album images for the at least one recommended sound source searched for through the display 430.

The first information about the first sound source may include information about the date of creation of the first sound source, the composer of the first sound source, the lyricist or music arranger of the first sound source, bitrate information about the first sound source, and sound source website information about the first sound source.

For example, where the date of creation of the first sound source is "2013-5-30," the processor 410 may search for at least one recommended sound source whose date of creation is "2013-5-30."

For example, where the composer of the first sound source is "Mozart," the processor 410 may search for at least one recommended whose composer is "Mozart."

For example, where the bitrate information about the first sound source is "24 bits," the processor 410 may search for at least one recommended whose bitrate information is "24 bits."

For example, where the sound source website information about the first sound source is "Samsung," the processor 410 may search for at least one recommended whose sound source website information is "Samsung."

Upon selection of an album image for a second sound source among album images for the at least one recommended sound source displayed, the processor 410 may include the selected album image for the second sound source in the folder including the album image for the first sound source.

Where the first object is a contact, upon receipt of a request for creating a folder including a first contact, the processor 410 may search for at least one recommended contact based on first information about the first contact and display, through the display 430, profile images for the at least one recommended contact searched.

The first information about the first contact may include a method for selecting at least recommended contact based on, e.g., the workplace information, address information, SNS use information, email information, title or nickname information of the first contact.

For example, where the workplace information of the first contact is "Samsung," the processor 410 may search for at least one recommended contact whose workplace information is "Samsung."

For example, where the address information of the first contact is "Dokokgdong, Seoul," the processor 410 may search for at least one recommended contact whose address information is "Dokokdong, Seoul."

For example, where the SNS use information of the first contact is "Facebook ID," the processor 410 may search for at least one recommended contact whose SNS use information is "Facebook ID."

For example, where the email information of the first contact is "samsung.com," the processor 410 may search for at least one recommended contact whose email information is "samsung.com."

For example, where the title information of the first contact is "Manager," the processor 410 may search for at least one recommended contact whose title information is "Manager."

For example, where the nickname information of the first contact is "Gomdori," the processor 410 may search for at least one recommended contact whose nickname information is "Gomdori."

Upon selection of a second contact among the profile images of the at least one contact displayed, the processor 410 may include the profile image of the second contact in the folder including the profile image of the first contact.

The input device 420 may receive a request for creating a folder. For example, the input device 420, if a touch panel, may receive an input such as a touch, long-touch, or drag to create a folder or a touch for selecting objects to be included in the folder.

The display 430 may display 430 a folder creation screen for creating a folder and a recommended object screen for display 430ing at least one recommended object. For example, the display 430, if a touchscreen, may receive touch inputs.

The memory 440 may store the first information about the first operation or all information used to provide recommended objects.

The communication module 450 may perform communication with an external electronic device or server 106.

To achieve the above objectives, according to various embodiments of the present invention, an electronic device comprises a display and a processor, wherein the processor may be configured to receive a request for creating a folder including a first object displayed on the display, search for at least one recommended object based on first information associated with the first object in response to the received request, and display the at least one recommended object searched for.

Figure 5:
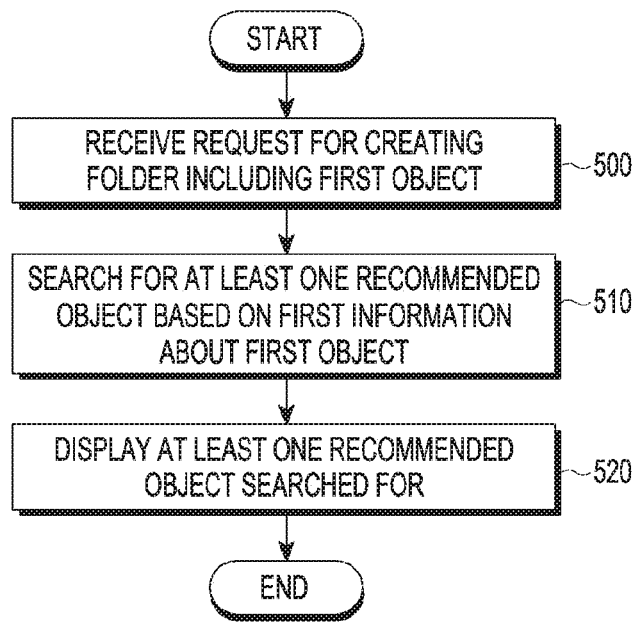
FIG. 5 is a flowchart illustrating providing a recommended object upon creating a folder including a first object according to various embodiments.

FIG. 5 is a flowchart illustrating providing a recommended object upon creating a folder including a first object according to various embodiments.

Referring to FIG. 5, in operation 500, an electronic device 400 (e.g., the processor 410) may receive a request for creating a folder including a first object.

In operation 510, the electronic device 400 (e.g., the processor 410) may search for at least one recommended object based on first information about the first object.

In operation 520, the electronic device 400 (e.g., the processor 410) may display at least one recommended object searched for.

The first object may include, e.g., an execution icon of a first application, a thumbnail image of a first photo, an album image of a first sound source, and a profile image of a first contact.

The recommended object may include, e.g., an execution icon of a recommended application, a thumbnail image of a recommended photo, an album image of a recommended sound source, and a profile image of a recommended contact.

Upon selection of a second object among at least one recommended object displayed, the electronic device 400 (e.g., the processor 410) may include the selected second object in the folder including the first object. Upon completing the creation of the folder, the electronic device 400 (e.g., the processor 410) may create a folder including the first object and the second object.

To achieve the above objectives, according to various embodiments of the present invention, a method for providing a recommended object by an electronic device comprises receiving a request for creating a folder including a first object displayed on a display, searching for at least one recommended object based on first information associated with the first object in response to the received request, and displaying the at least one recommended object searched for.

Figure 6:
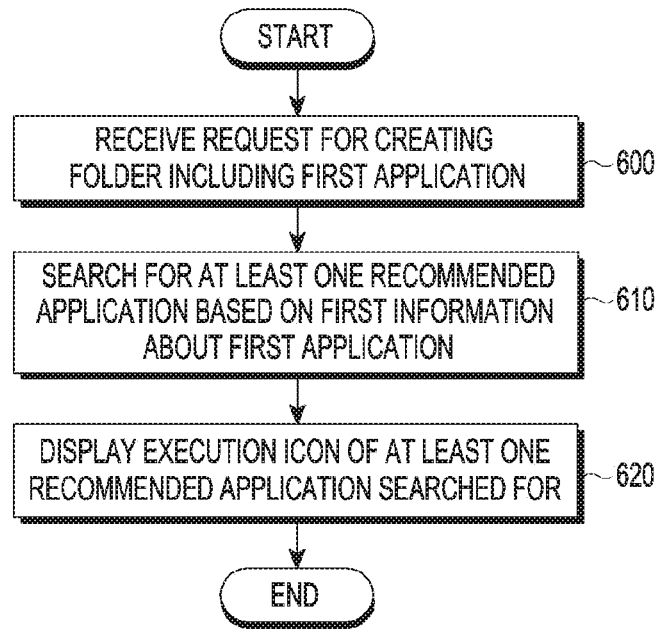
FIG. 6 is a flowchart illustrating providing a recommended application upon creating a folder including a first application according to various embodiments.

FIG. 6 is a flowchart illustrating providing a recommended application upon creating a folder including a first application according to various embodiments.

Referring to FIG. 6, the electronic device 400 (e.g., the processor 410) may receive a request for creating a folder including a first application in operation 600. For example, upon a long-touch input on the execution icon of the first application on a home screen displaying execution icons for at least one application installed on the electronic device 400, the electronic device 400 (e.g., the processor 410) may display a folder creation area while shrinking the home screen. If the long-touched execution icon of the first application is dragged and included in the folder creation area, the electronic device 400 (e.g., the processor 410) may determine it as a request for creating a folder.

In operation 610, the electronic device 400 (e.g., the processor 410) may search for at least one recommended application based on first information about the first application.

For example, the electronic device 400 (e.g., the processor 410) may search for at least one recommended application based on, e.g., the category, search information, folder information, icon color, or icon shape of the first application.

In operation 620, the electronic device 400 (e.g., the processor 410) may display execution icons of at least one recommended application searched for.

If the execution icon of the second application is selected among the execution icons of the at least recommended application displayed, the electronic device 400 (e.g., the processor 410) may include the selected execution icon of the second application in the folder including the execution icon of the first application, and upon completing the creation of the folder, may create a folder including the icon of the first application and the icon of the second application.

Figure 7:
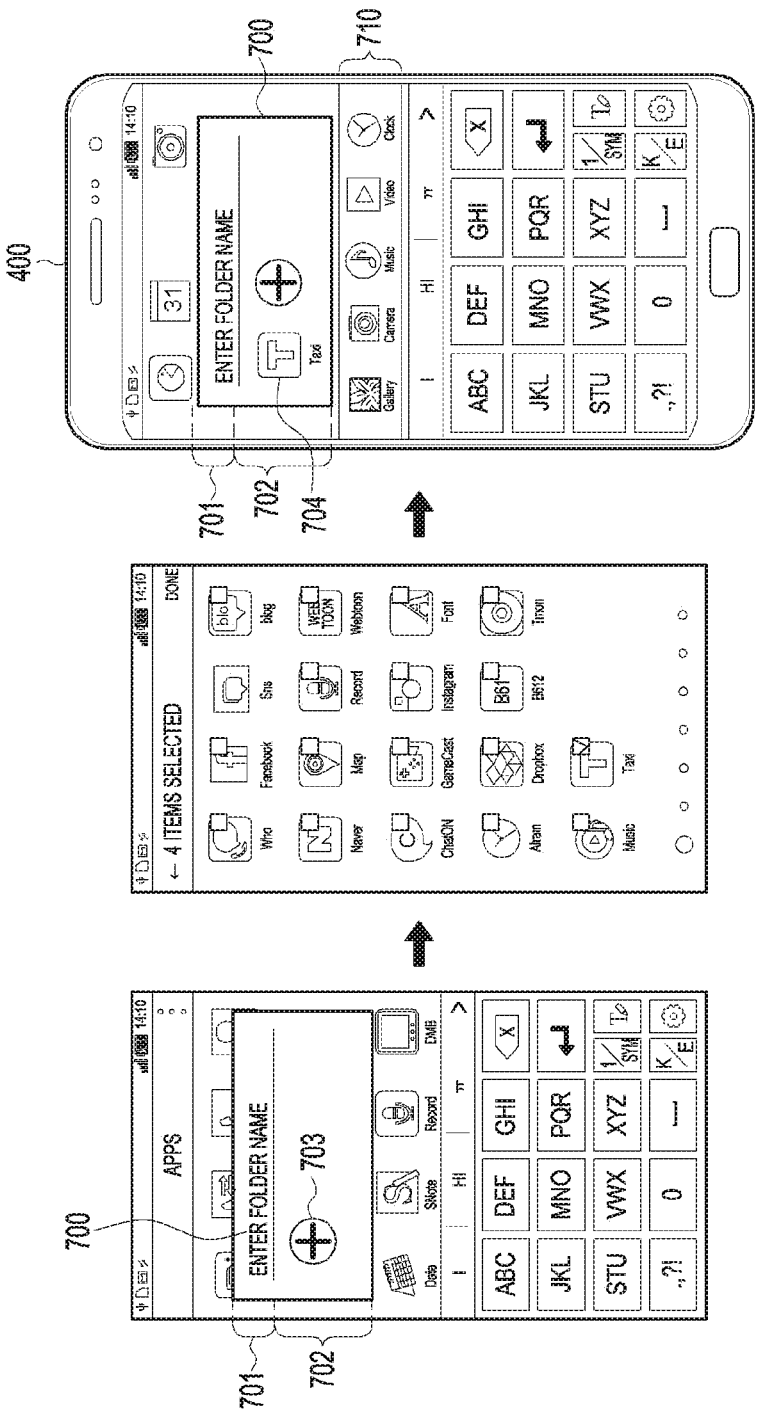
FIG. 7 illustrates examples for describing a method for providing a recommended application as per a request for creating a first folder including an execution icon of a first application according to various embodiments.

FIG. 7 illustrates examples for describing a method for providing a recommended application as per a request for creating a first folder including an execution icon of a first application according to various embodiments.

Referring to FIG. 7, upon receipt of a touch input or key input through the input device 420 on a home screen displaying execution icons for at least one application installed on the electronic device 400, the electronic device 400 (e.g., the processor 410) may display a folder creation screen 700 as shown in (a) of FIG. 7.

The folder creation screen 700 may include an input area 701 for inputting folder names and a display area 702 for displaying execution icons of at least one application to be included in the folder.

Upon selection of an icon 703 for selecting at least one application to be included in the folder through the input device 420, the electronic device 400 (e.g., the processor 410) may display execution icons for at least one application installed on the electronic device 400 as shown in (b) of FIG. 7.

Upon selecting an execution icon for the first application through the input device 420, the electronic device 400 (e.g., the processor 410) may search for at least one recommended application based on first information about the first application and display execution icons for at least one recommended application searched for as shown in (c) of FIG. 7. The electronic device 400 (e.g., the processor 410) may display a recommended application screen 710 including execution icons for at least one recommended application under or at the bottom of the folder creation screen 700.

For example, if an icon for a "taxi information application" is selected, the electronic device 400 (e.g., the processor 410) may include the execution icon 704 of the "taxi information application" in the display area 702 of the folder creation screen 700 and search for at least one recommended application based on first information about the "tax information application." Specifically, the electronic device 400 (e.g., the processor 410) may search for at least one recommended application based on at least one of, e.g., a category for the "taxi information application," search information about the "taxi information application," folder information about the "taxi information application," icon color, icon shape, or developer of the "taxi information application," and a folder name entered through the input device.

Where the category of the "taxi information application" is "transportation," the electronic device 400 (e.g., the processor 410) may search for at least one recommended application whose category is "transportation."

Where the search information about the "taxi information application" is "public transportation," the electronic device 400 (e.g., the processor 410) may search for at least one recommended application with "public transportation" in their name, category name, description, or reviews.

Where a similar user corresponding to a similar age group or gender to the user of the electronic device 400 of the "taxi information application" creates a folder including a "bus information application" along with the "taxi information application," the electronic device 400 (e.g., the processor 410) may search for the "bus information application."

Where the color of the execution icon of the "taxi information application" is "yellow," the electronic device 400 (e.g., the processor 410) may search for at least one recommended application whose execution icon color is "yellow."

Where the icon shape of the "taxi information application" includes the letter "T," the electronic device 400 (e.g., the processor 410) may search for at least one recommended application whose icon shape includes the letter "T."

Where the folder name of the folder including the "taxi information application" is "public transportation," the electronic device 400 (e.g., the processor 410) may search for at least one recommended application with "public transportation" in their name, category name, description, or reviews.

Figure 8:
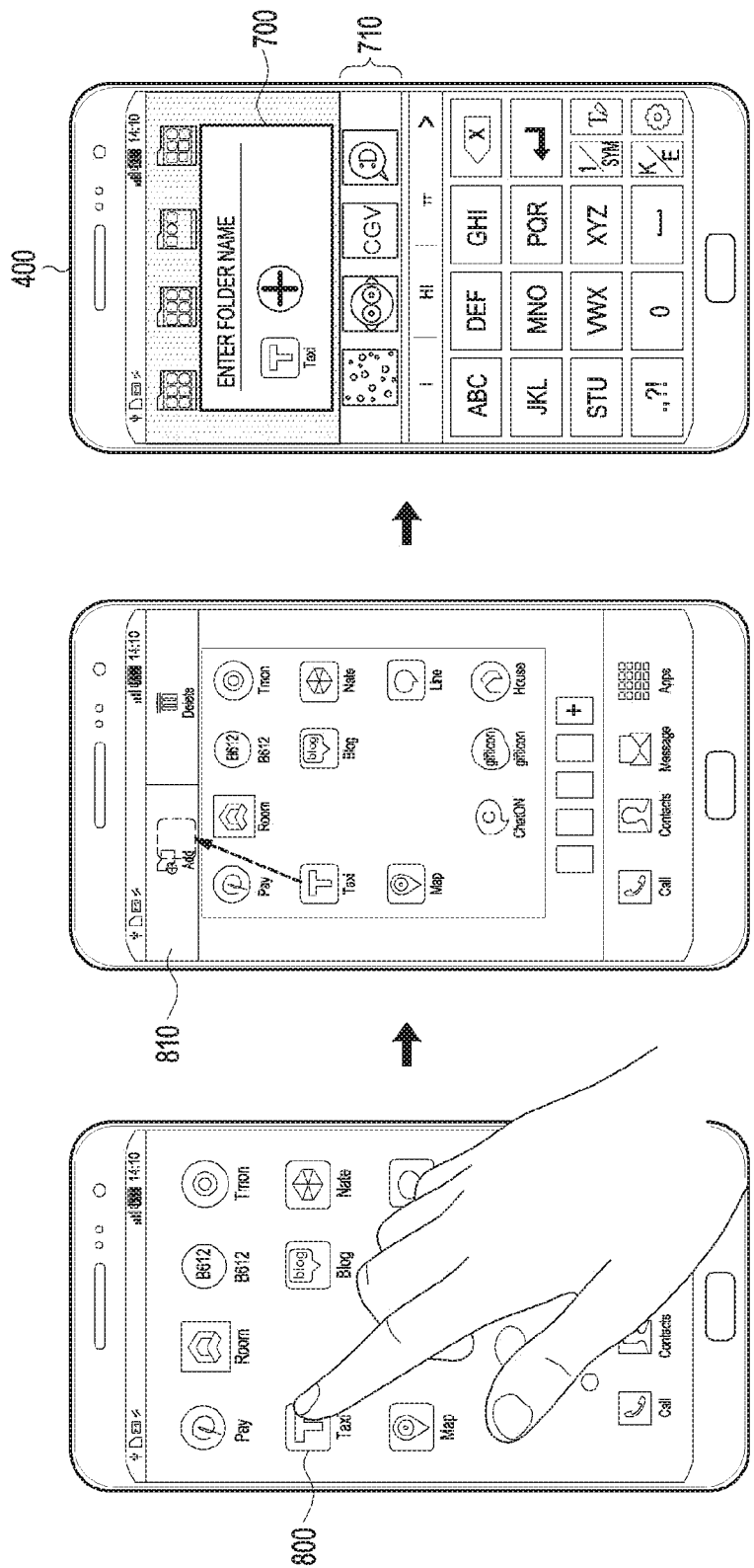
FIG. 8 illustrates examples for describing a method for providing a recommended application as per a request for creating a second folder including an execution icon of a first application according to various embodiments.

FIG. 8 illustrates examples for describing a method for providing a recommended application as per a request for creating a second folder including an execution icon of a first application according to various embodiments.

Referring to FIG. 8, upon a long-touch input 800 on the execution icon of the first application on the home screen displaying execution icons for at least one application installed on the electronic device 400 as shown in (a) of FIG. 8, the electronic device 400 (e.g., the processor 410) may display a folder creation area 810 enabling creation of a new folder at the top of the home screen while shrinking the home screen as shown in (b) of FIG. 8.

If the long-touched execution icon of the first application is dragged to the folder creation area 810, the electronic device 400 (e.g., the processor 410) may display a folder creation screen 700 including the execution icon of the first application as shown in (c) of FIG. 8, search for at least one recommended application based on first information about the first application, and display a recommended application screen 710 including execution icons of at least one recommended application searched for.

Figure 9:
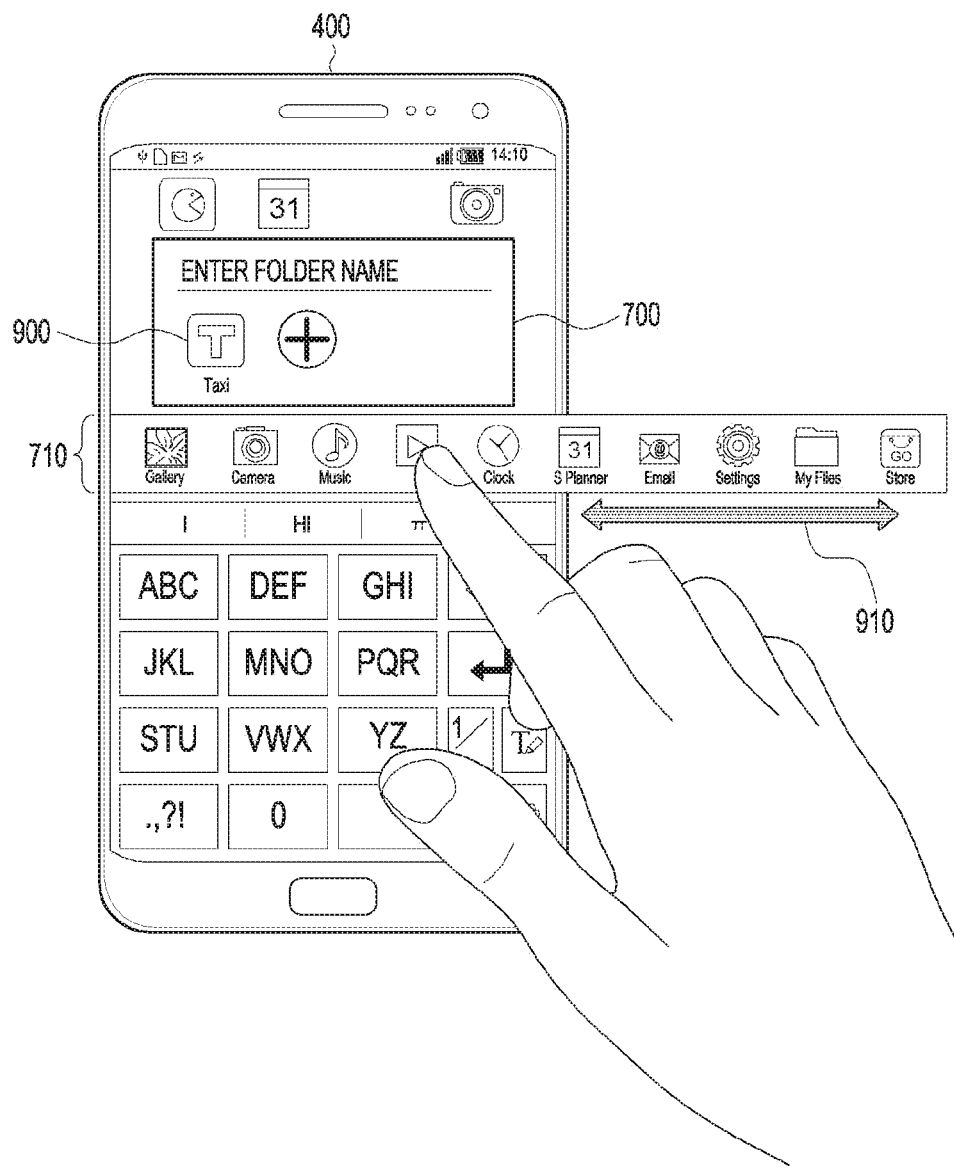
FIG. 9 illustrates an example of an icon display screen for a recommended application according to various embodiments.

FIG. 9 illustrates an example of an icon display screen for a recommended application according to various embodiments.

Referring to FIG. 9, the electronic device 400 (e.g., the processor 410) may display a recommended application screen 710 including execution icons for at least one recommended application at the bottom of the folder creation screen 700 including the execution icon 900 of the first application. The execution icons of the at least one recommended application included in the recommended application screen 710 may be selected by the user's body (e.g., his finger) or an input device (e.g., a stylus pen).

Where the number of application icons displayable on the recommended application screen 710 is smaller than the number of the icons of the recommended applications, the electronic device 400 (e.g., the processor 410) may additionally display application execution icons which would otherwise be not displayed by a touch input 910 such as a swipe left or swipe right.

If the execution icon of the second application is selected among at least one recommended application icon included in the recommended application screen 710, the electronic device 400 (e.g., the processor 410) may add the selected execution icon of the second application to the folder creation area 700 and display.

Upon completing the creation of the folder, the electronic device 400 (e.g., the processor 410) may create a folder including execution icons of at least one application included in the folder creation area 700.

Figure 10:
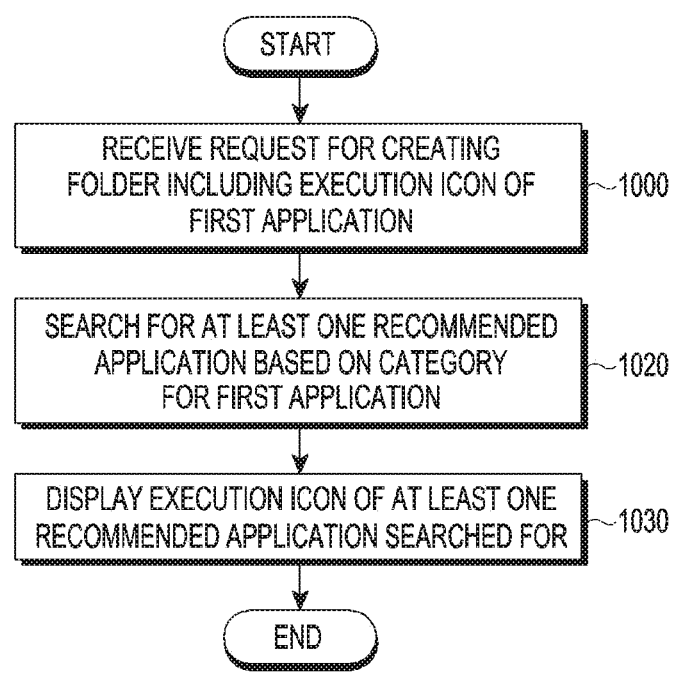
FIG. 10 is a flowchart illustrating operations for providing a recommended application based on categories upon creating a folder including a first application according to various embodiments.

FIG. 10 is a flowchart illustrating operations for providing a recommended application based on categories upon creating a folder including a first application according to various embodiments.

Referring to FIG. 10, in operation 1000, the electronic device 400 (e.g., the processor 410) may receive a request for creating a folder including the execution icon of the first application.

In operation 1010, the electronic device 400 (e.g., the processor 410) may search for at least one recommended application based on a category for the first application.

In operation 1020, the electronic device 400 (e.g., the processor 410) may display execution icons of at least one recommended application searched for.

For example, where the category of the first application is "education," the electronic device 400 (e.g., the processor 410) may search for at least one recommended application whose category is "education" and display the execution icons of recommended applications searched for.

Figures 11A, 11B, 11C:
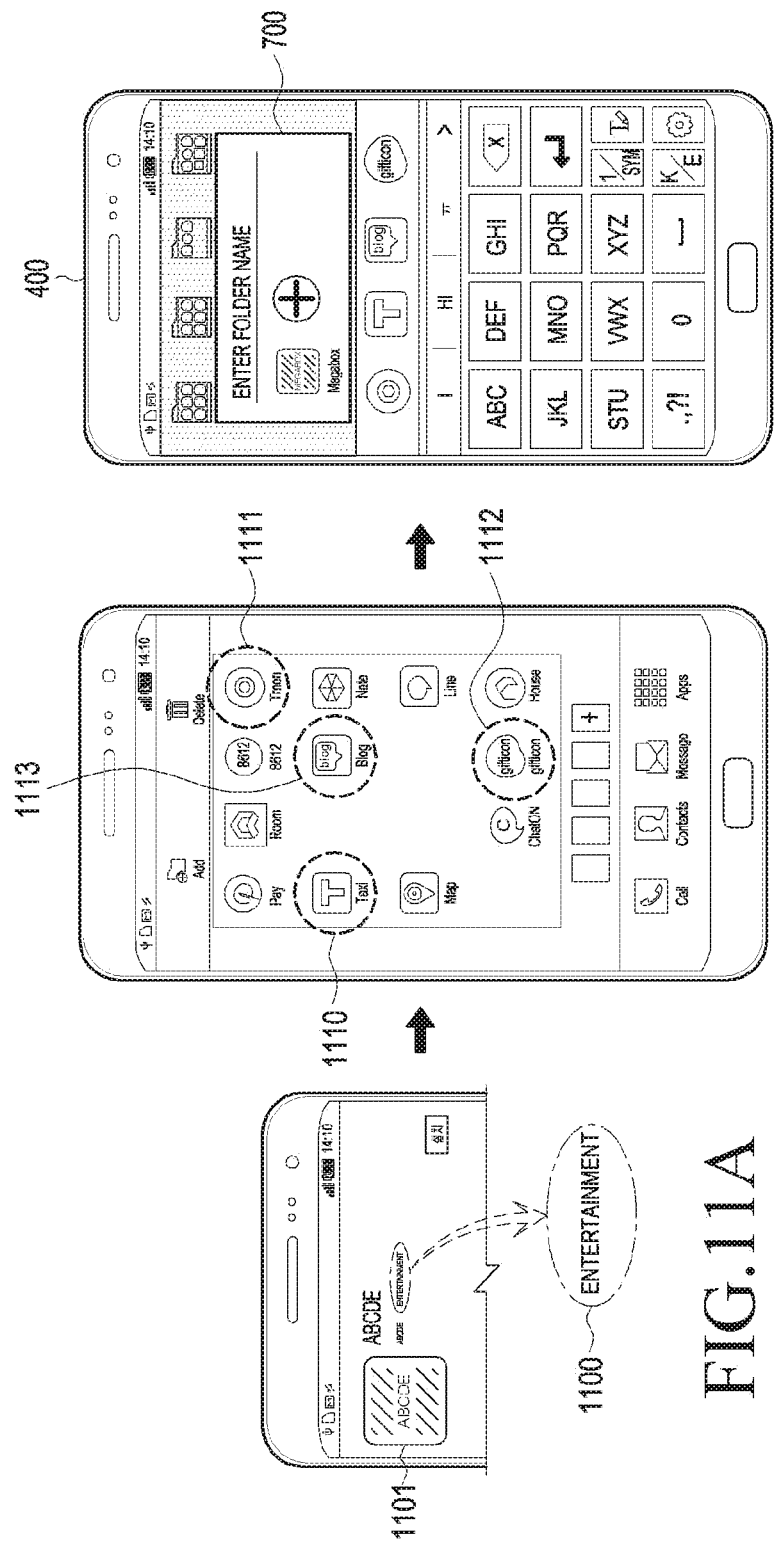
FIG. 11 illustrates examples of operations for providing a recommended application based on the category of a first application upon creating a folder including the first application according to various embodiments.

FIG. 11 illustrates examples of operations for providing a recommended application based on the category of a first application upon creating a folder including the first application according to various embodiments.

Referring to FIG. 11, for example, upon receipt of a request for creating a folder including an execution icon 1101 for a "movie information application" whose category is "entertainment" 1000, as shown in (a) of FIG. 11, the electronic device 400 (e.g., the processor 410) may search for at least one recommended application 1110, 1111, 1112, and 1113 whose category is "entertainment" as shown in (b) of FIG. 11. As shown in (c) of FIG. 11, the electronic device 400 (e.g., the processor 410) may display a recommended application screen 710 including execution icons for at least one recommended application along with the folder creation screen 700 including the execution icon 1101 of the "movie information application."

Figure 12:
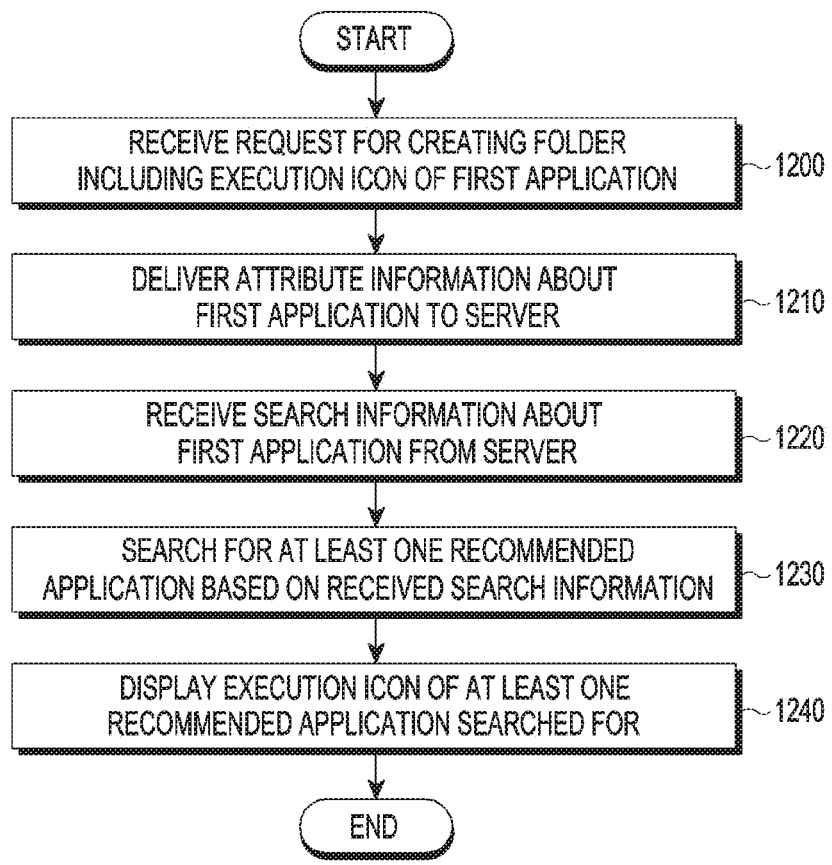
FIG. 12 is a flowchart illustrating operations for providing a recommended application based on search information about a first application upon creating a folder including a first application according to various embodiments.

FIG. 12 is a flowchart illustrating operations for providing a recommended application based on search information about a first application upon creating a folder including a first application according to various embodiments.

Referring to FIG. 12, in operation 1200, the electronic device 400 (e.g., the processor 410) may receive a request for creating a folder including a first application.

In operation 1210, the electronic device 400 (e.g., the processor 410) may deliver attribute information about the first application to the server 106. The electronic device 400 (e.g., the processor 410) may deliver, to the server 106, a request message for requesting search information about the first application and including the attribute information about the first application.

For example, the server 106 may include a search engine and provide search information associated with the attribute information through the search engine.

The attribute information may include information, such as the name, category name, use frequency, download count, description or reviews of the first application and the name, category name, or user frequency of applications associated with the first application.

In operation 1220, the electronic device 400 (e.g., the processor 410) may receive search information about the first application from the server 106. For example, the search information about the first application may include the results of searching for the attribute information about the first application through the search engine of the server 106.

In operation 1230, the electronic device 400 (e.g., the processor 410) may search for at least one recommended application based on the received search information.

In operation 1240, the electronic device 400 (e.g., the processor 410) may display execution icons of at least one recommended application searched for.

For example, where the category name of the first application is "education," if attribute information including "education" is delivered to the server 106, the server 106 may search for "education" through the search engine, and where the results of searching for "education" are "schools" or "educational broadcasts," the server 106 may deliver search information including "schools" or "educational broadcasts" to the electronic device 400.

For example, where the category name of the first application is "education," the electronic device 400 (e.g., the processor 410) may do an Internet search, obtaining search information including "schools" or "educational broadcasts" which correspond to a result of searching for "education."

The electronic device 400 (e.g., the processor 410) may search for at least one recommended application associated with "schools" or "educational broadcasts" and display execution icons of at least one recommended application searched for.

Figure 13:
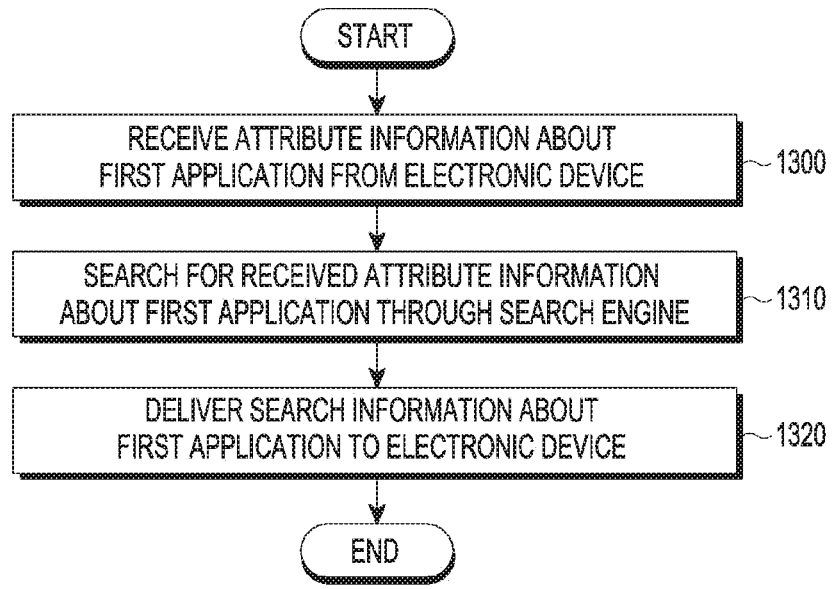
FIG. 13 is a flowchart illustrating operations of a server to provide search information about a first application upon creating a folder including the first application according to various embodiments.

FIG. 13 is a flowchart illustrating operations of a server to provide search information about a first application upon creating a folder including the first application according to various embodiments.

Referring to FIG. 13, in operation 1300, the server 106 may receive attribute information about the first application from the electronic device 400.

In operation 1310, the server 106 may search for the received attribute information about the first application through the search engine.

In operation 1320, the server 106 may deliver search information about the first application to the electronic device 400. The search information about the first application may include the results of searching for the attribute information about the first application through the search engine.

Figure 14:
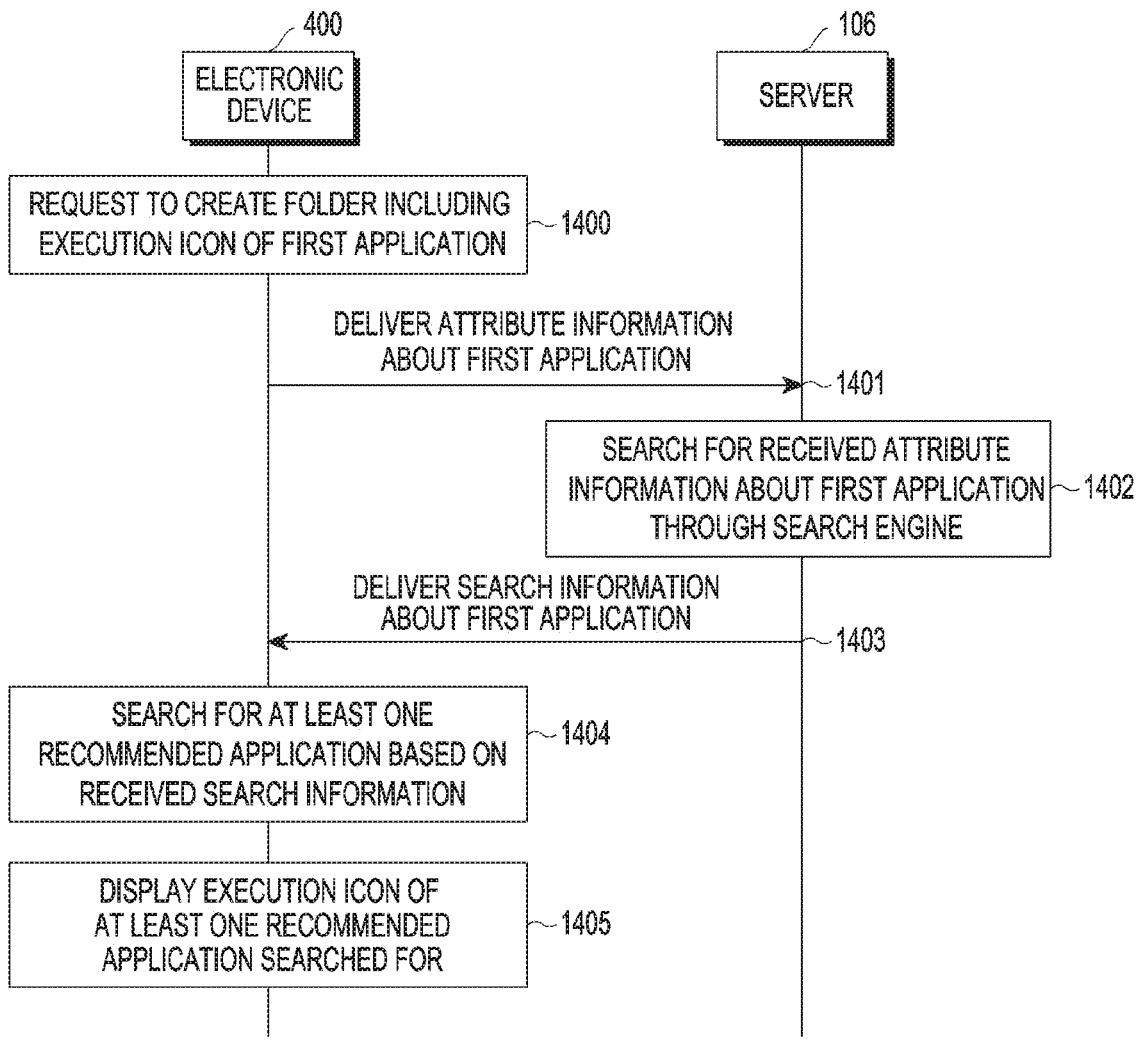
FIG. 14 is a flowchart illustrating signals for operations of a server and an electronic device to provide a recommended application by the electronic device receiving search information about a first application from the server upon creating a folder including the first application according to various embodiments.

FIG. 14 is a flowchart illustrating signals for operations of a server and an electronic device to provide a recommended application by the electronic device receiving search information about a first application from the server upon creating a folder including the first application according to various embodiments.

In operation 1400, the electronic device 400 may receive a request for creating a folder including the execution icon of the first application.

In operation 1401, the electronic device 400 may deliver attribute information about the first application to the server 106.

In operation 1402, the server 106 may search for the received attribute information about the first application through the search engine.

In operation 1403, the server 106 may deliver search information about the first application to the electronic device 400.

In operation 1404, the electronic device 400 may search for at least one recommended application based on the received search information.

In operation 1405, the electronic device 400 may display execution icons of at least one recommended application searched for.

Figure 15:
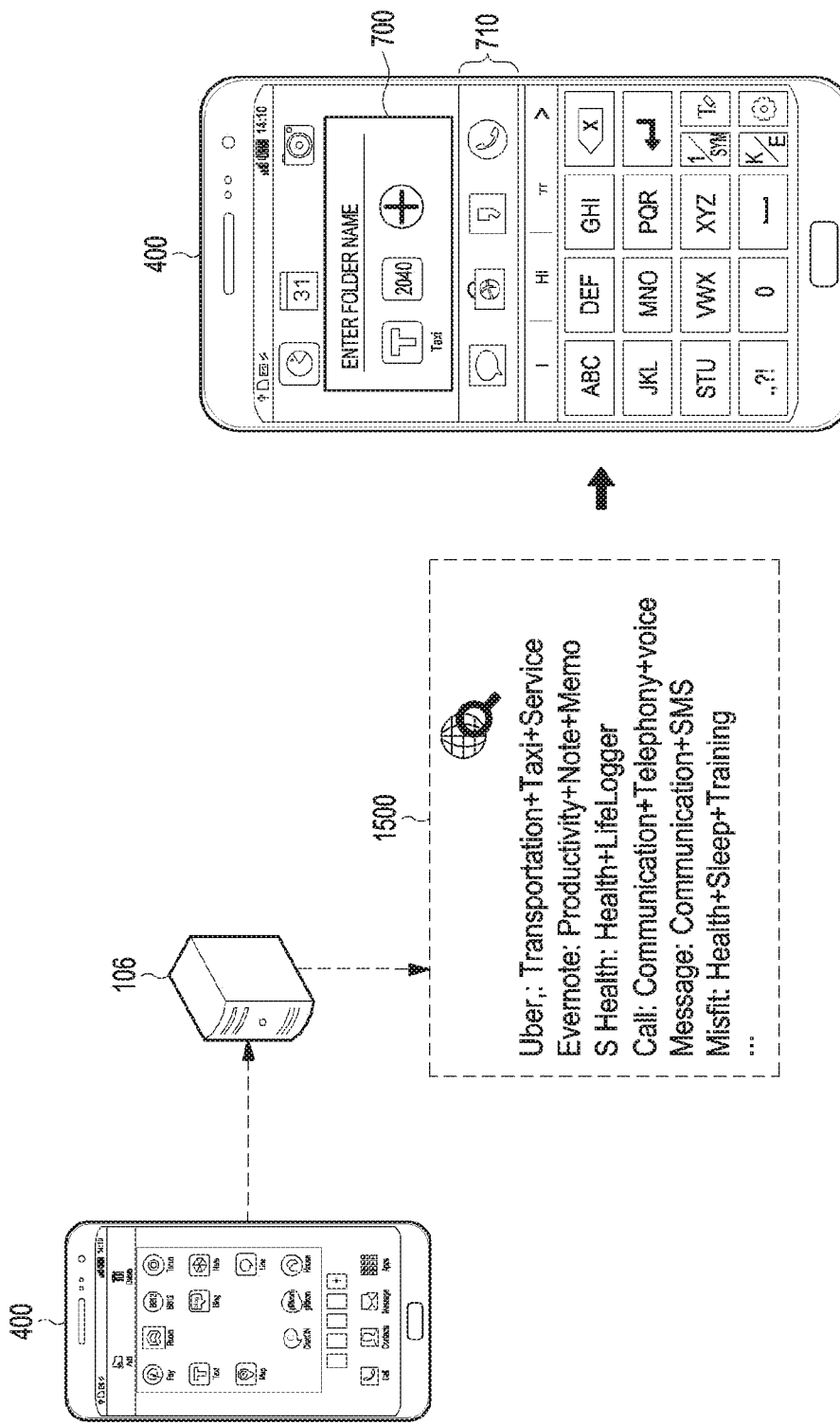
FIG. 15 illustrates examples of operations for providing a recommended application based on search information about a first application upon creating a folder including the first application according to various embodiments.

FIG. 15 illustrates examples of operations for providing a recommended application based on search information about a first application upon creating a folder including the first application according to various embodiments.

Referring to FIG. 15, the electronic device 400 may deliver attribute information about a first application to the server 106 as per a request for creating a folder including the first application.

The server 106 may search for attribute information through the search engine and store search information corresponding to a result of searching for attribute information. For example, where the attribute information about an "Uber" application is "Transportation," the server 106 may search for "Transportation" through the search engine and store a "Taxi", "Service" corresponding to a result of the search, as the search information about the "Uber" application. As such, the server 1300 may store search information 1500 (e.g., note, memo, LifeLogger, Telephoney, voice, SMS, Sleep, or Training) corresponding to the result of searching for attribute information (e.g., Productivity, Health, or Communication) about a plurality of applications (e.g., evernote, S Health, phone, message, or Misfit) and deliver the search information to the electronic device 400.

Having received the search information from the server 106, the electronic device 400 may search for at least one recommended application based on the search information and display a recommended application screen 710 including execution icons of at least one recommended application searched for at the bottom of the folder creation screen 700 including the execution icon of the first application. For example, where the search information received from the server 106 is "Taxi", "Service," the electronic device 400 may search for at least one recommended application associated with "Taxi", "Service" and display execution icons of at least one recommended application searched for.

Figure 16:
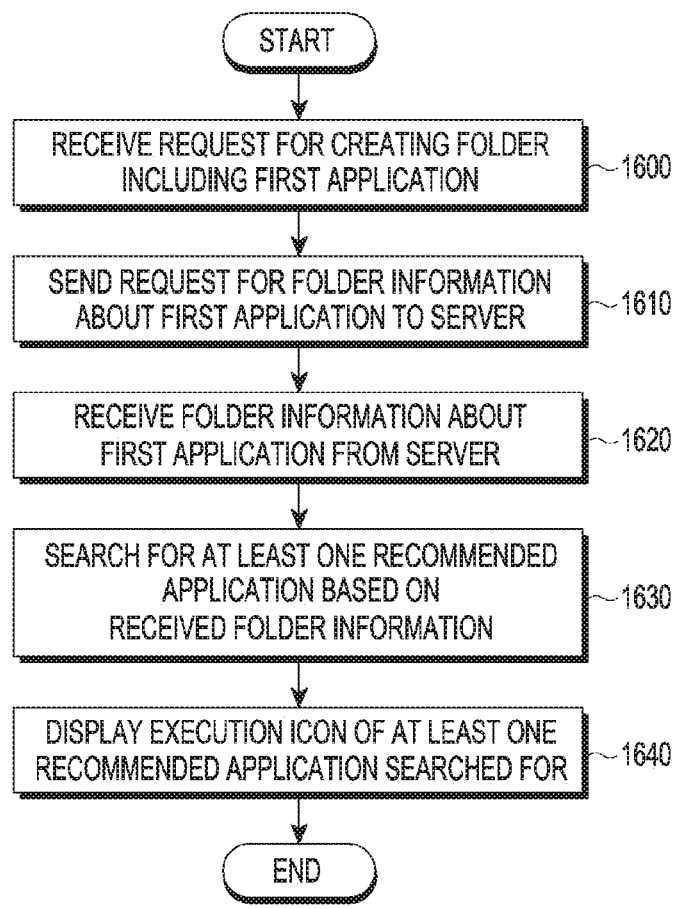
FIG. 16 is a flowchart illustrating operations for providing a recommended application based on folder information about a first application upon creating a folder including a first application according to various embodiments.

FIG. 16 is a flowchart illustrating operations for providing a recommended application based on folder information about a first application upon creating a folder including a first application according to various embodiments.

Referring to FIG. 16, in operation 1600, the electronic device 400 (e.g., the processor 410) may receive a request for creating a folder including a first application.

In operation 1610, the electronic device 400 (e.g., the processor 410) may send a request for folder information about the first application to the server 106. For example, the electronic device 400 (e.g., the processor 410) may produce a folder information request message including, e.g., the user ID, name, age, or gender of the user of the electronic device 400 using the first application and deliver the produced folder information request message to the server 106.

In operation 1620, the electronic device 400 (e.g., the processor 410) may receive folder information about the first application from the server 106. The folder information may include folders created by similar users of a similar age group or gender to the user of the electronic device 400 and at least one application included in the folders.

For example, where among users using the first application, a similar user corresponding to a similar age group or gender to the user of the electronic device 400 creates a folder including the first application, the folder information may include information about at least one application included in the folder that the similar user has created.

In operation 1630, the electronic device 400 (e.g., the processor 410) may search for at least one recommended application based on the received folder information. For example, where another application added to the folder including the first application by a similar user of a similar age group or gender, the user of the electronic device using a "movie information application" is a "movie booking application," the electronic device 400 (e.g., the processor 410) may search for the "movie booking application."

According to an embodiment, where the "movie booking application" searched for has yet installed on the electronic device 400, the electronic device 400 (e.g., the processor 410) may provide an installation screen for installing the "movie booking application."

In operation 1640, the electronic device 400 (e.g., the processor 410) may display execution icons of at least one recommended application searched for.

Figure 17:
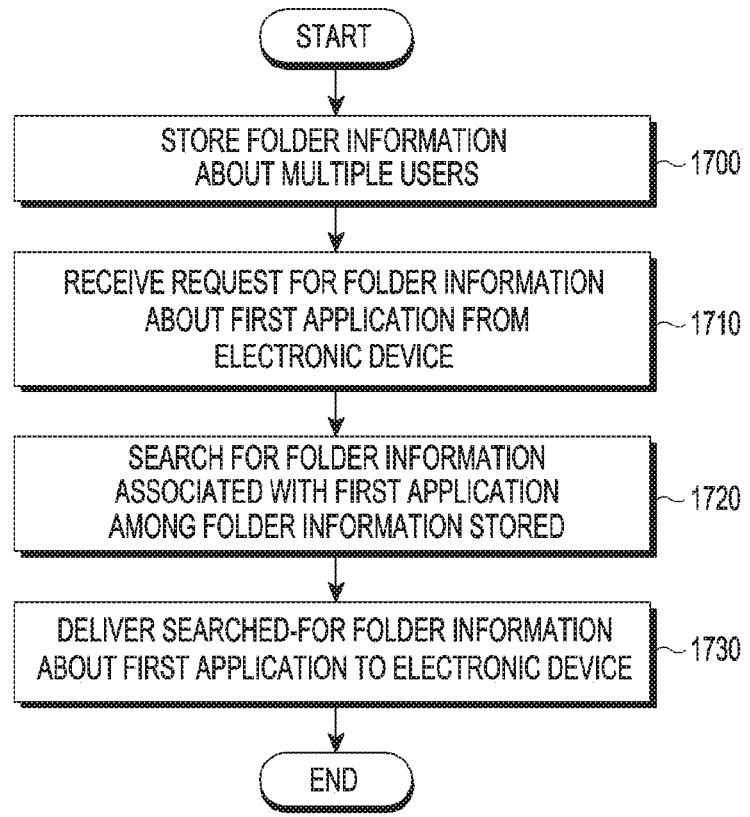
FIG. 17 is a flowchart illustrating operations of a server to provide folder information about a first application upon creating a folder including the first application according to various embodiments.

FIG. 17 is a flowchart illustrating operations of a server to provide folder information about a first application upon creating a folder including the first application according to various embodiments.

Referring to FIG. 17, in operation 1700, the server 106 may store folder information about a plurality of users. For example, the server 106 may include a database or memory and store, in the database or memory, information about folders created corresponding to the user ID, user name, age, and gender of the plurality of users and information about at least one application included in the folders.

In operation 1710, the server 106 may receive a request for folder information about the first application from the electronic device 400. For example, the server 106 may receive a folder information request message including information about the user of the electronic device 400.

In operation 1720, the server 106 may search for folder information associated with the first application among folder information stored. For example, the server 106 may search for folder information about similar users of a similar age group or gender to the user of the electronic device 400 among users of the first application.

In operation 1730, the server 106 may deliver the searched-for folder information about the first application to the electronic device 400. For example, the server 106 may produce a response message including folder information about similar users using the first application and deliver the response message to the electronic device 400.

Figure 18:
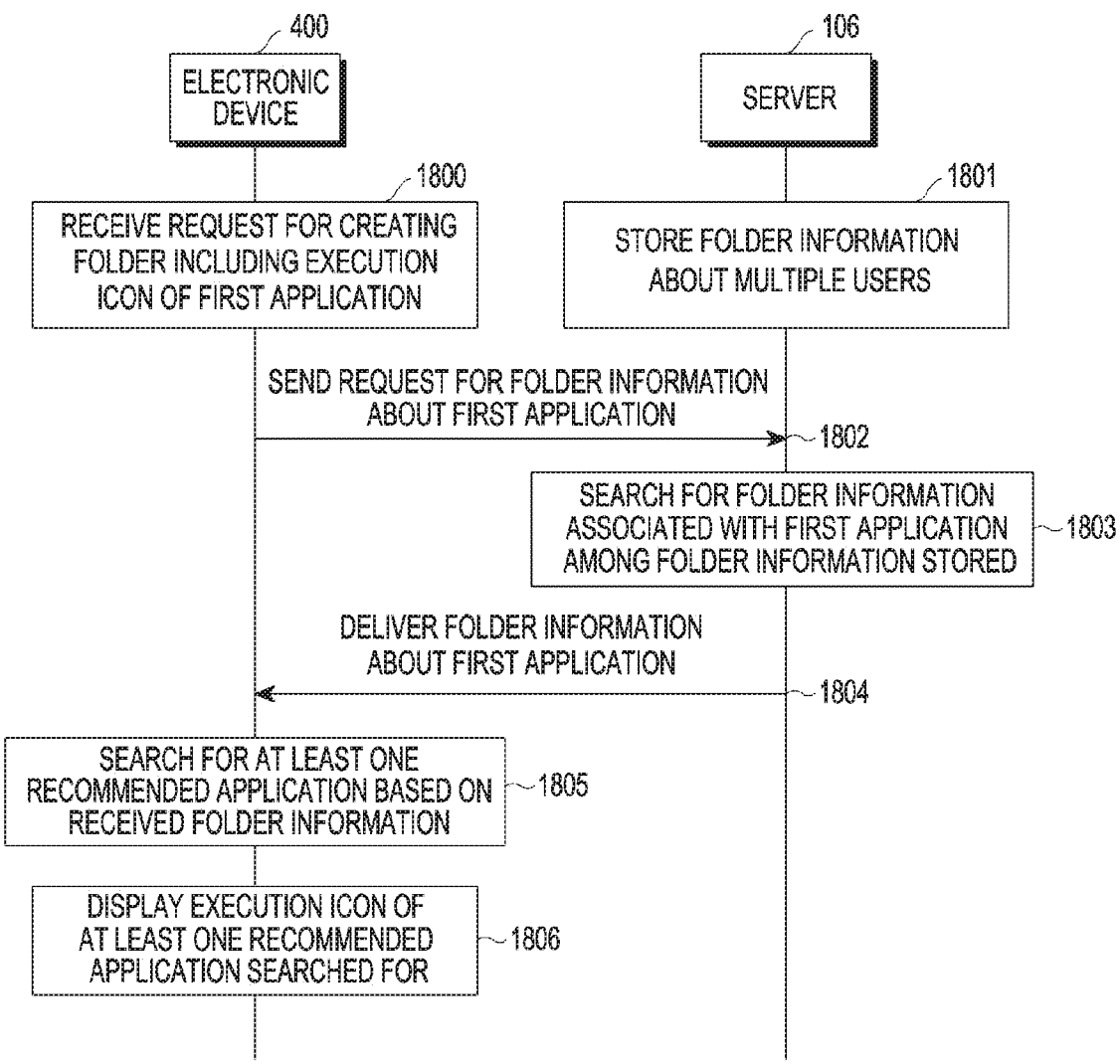
FIG. 18 is a flowchart illustrating signals for operations of a server and an electronic device to provide a recommended application by the electronic device receiving folder information about a first application from the server upon creating a folder including the first application according to various embodiments.

FIG. 18 is a flowchart illustrating signals for operations of a server and an electronic device to provide a recommended application by the electronic device receiving folder information about a first application from the server upon creating a folder including the first application according to various embodiments.

Referring to FIG. 18, in operation 1800, the electronic device 400 may receive a request for creating a folder including the execution icon of the first application.

In operation 1801, the server 106 may store folder information about a plurality of users. Operation 1800 and operation 1801 may separately be performed.

In operation 1802, the electronic device 400 may send a request for folder information about the first application to the server 106. For example, the electronic device 400 may deliver a folder information request message including information about the user of the electronic device 400 to the server 106.

In operation 1803, the server 106 may search for folder information associated with the first application among folder information stored. For example, folder information associated with the first application may be folder information about similar users of a similar age group or gender to the user of the electronic device 400 among users of the first application.

In operation 1804, the server 106 may deliver folder information about the first application to the electronic device.

In operation 1805, the electronic device 400 may search for at least one recommended application based on the received folder information.

In operation 1806, the electronic device 400 may display execution icons of at least one recommended application searched for.

Figure 19:
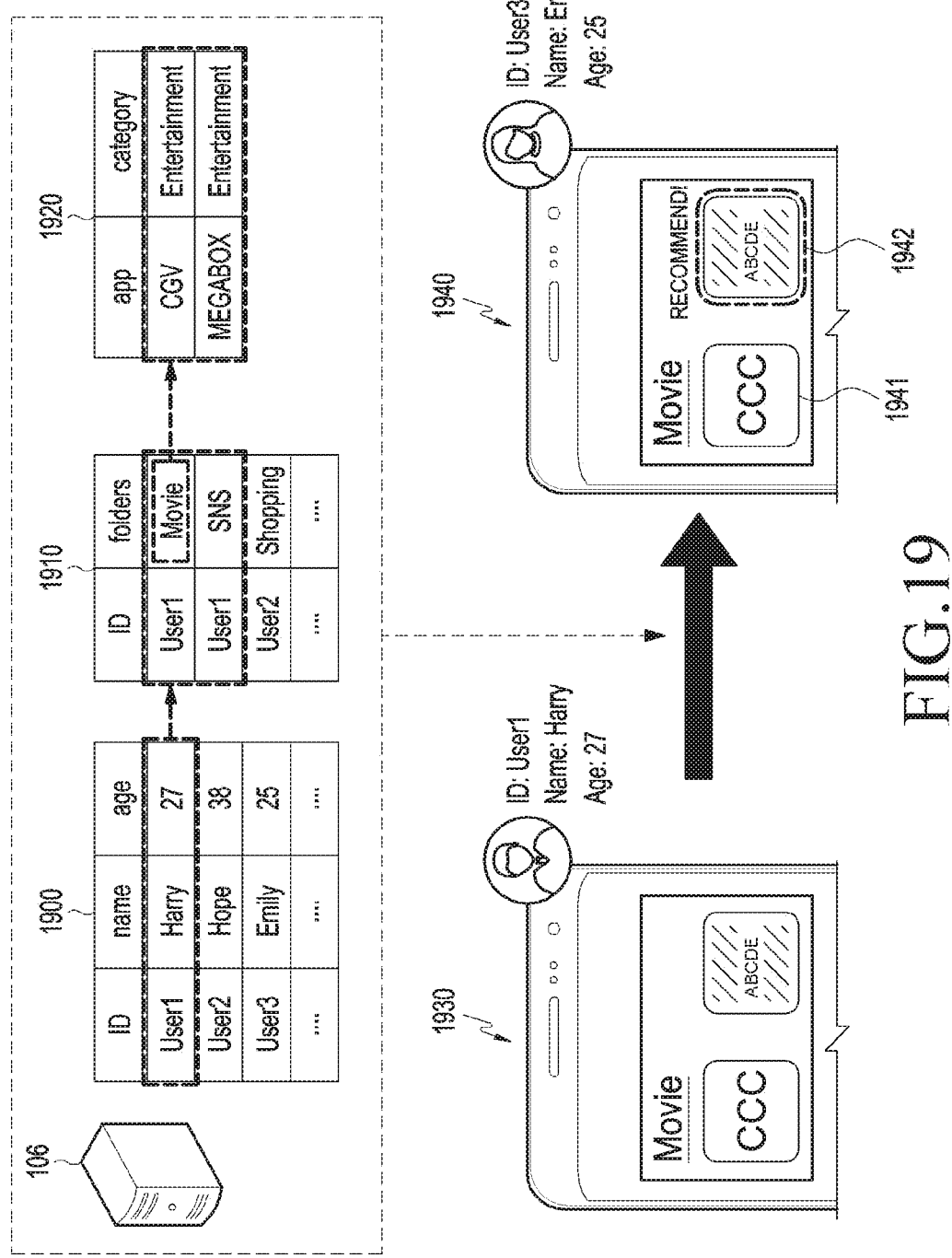
FIG. 19 illustrates examples of operations for providing a recommended application based on application folder information about a user layer of a first application upon creating a folder including the first application according to various embodiments.

FIG. 19 illustrates examples of operations for providing a recommended application based on application folder information about a user layer of a first application upon creating a folder including the first application according to various embodiments.

Referring to FIG. 19, the server 106 that gathers and stores application folder information about a user layer using at least one application may store user information 1900 including user ID, user name, or user age and folder information 1910 and 1920 including the folder name created by the user and information about at least one application included in the folder, with the user information 1900 corresponding to the folder information 1910 and 1920.

For example, upon receipt a request for a third user to create a folder including a first movie booking application (e.g., CGV), the electronic device 400 may produce a request message for requesting folder information about the first movie booking application and deliver the request message to the server 1400. The request message may include user information about the third user using the first movie booking application, such as the user ID (e.g., User3), name (e.g., Emily), and age (e.g., 25 years old).

Having received the request message, the server 106 may search for folder information about a first user who is a similar user of a similar age group or gender to the third user and uses the first movie booking application among folder information stored.

As denoted by reference number 1930 of FIG. 19, where the first user adds a second movie booking application (e.g., MEGABOX) to the Movie folder including the first movie booking application, the server 106 may deliver a response message including the folder information about the first user to the electronic device 400. The response message may include information about the second movie booking application.

Having received the response message, the electronic device 400 may search for the second movie booking application and display an execution icon for the second movie booking application searched for. Upon selecting the execution icon for the second movie booking application, the electronic device 400 may create a folder including the execution icon 1941 of the first movie booking application and the execution icon 1942 of the second movie booking application as denoted by reference number 1940 of FIG. 19.

According to various embodiments, the electronic device 400 may display an installation screen for the second movie booking application upon failing to search for the second movie booking application.

Figure 20:
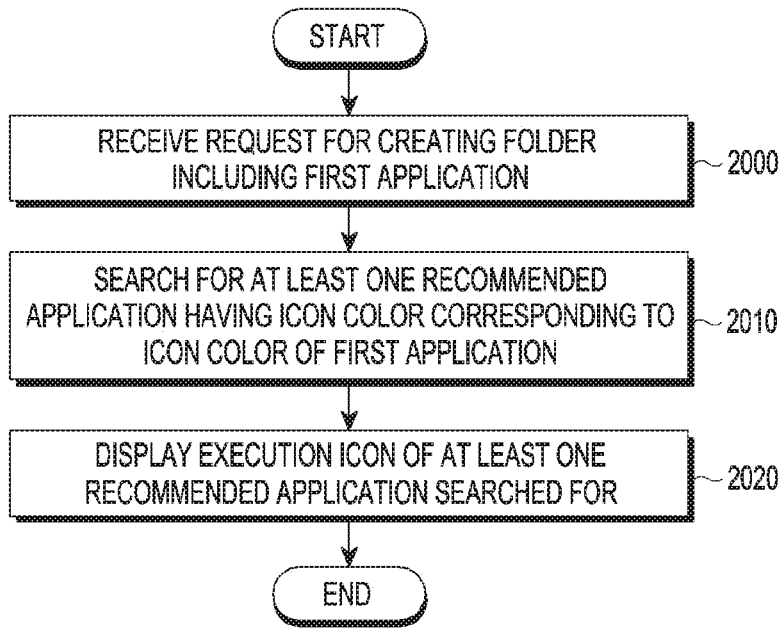
FIG. 20 is a flowchart illustrating operations for providing a recommended application based on an icon color of a first application upon creating a folder including a first application according to various embodiments.

FIG. 20 is a flowchart illustrating operations for providing a recommended application based on an icon color of a first application upon creating a folder including a first application according to various embodiments.

Referring to FIG. 20, in operation 2000, the electronic device 400 (e.g., the processor 410) may receive a request for creating a folder including a first application.

In operation 2010, the electronic device 400 (e.g., the processor 410) may search for at least one recommended application having an icon color corresponding to the icon color of the first application. For example, where the icon color of the first application is "red," the electronic device 400 (e.g., the processor 410) may search for at least one recommended application whose icon color is "red."

In operation 2020, the electronic device 400 (e.g., the processor 410) may display execution icons of at least one recommended application searched for.

Figure 21:
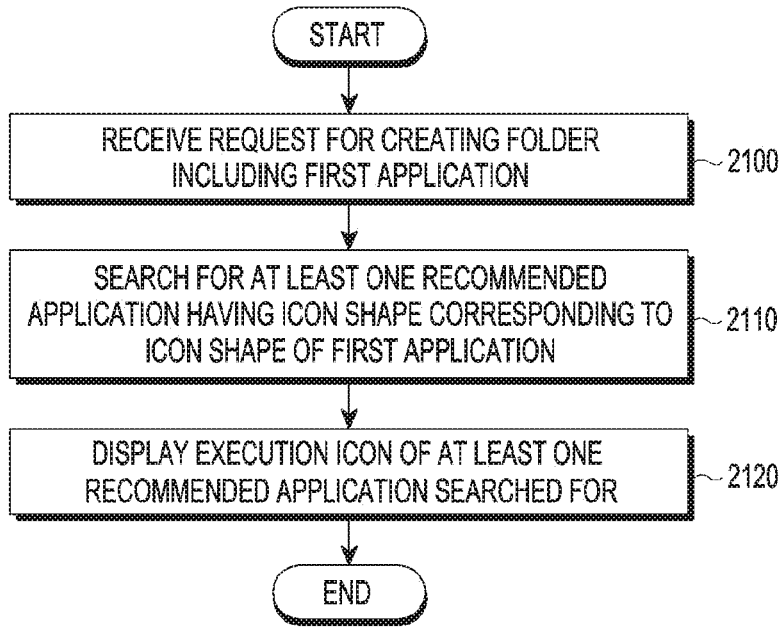
FIG. 21 is a flowchart illustrating operations for providing a recommended application based on an icon shape of a first application upon creating a folder including a first application according to various embodiments.

FIG. 21 is a flowchart illustrating operations for providing a recommended application based on an icon shape of a first application upon creating a folder including a first application according to various embodiments.

Referring to FIG. 21, in operation 2100, the electronic device 400 (e.g., the processor 410) may receive a request for creating a folder including a first application.

In operation 2110, the electronic device 400 (e.g., the processor 410) may search for at least one recommended application having an icon shape corresponding to the icon shape of the first application. For example, where the icon shape of the first application is "rectangle," the electronic device 400 (e.g., the processor 410) may search for at least one recommended application whose icon shape is "rectangle."

In operation 2120, the electronic device 400 (e.g., the processor 410) may display execution icons of at least one recommended application searched for.

Figure 22:
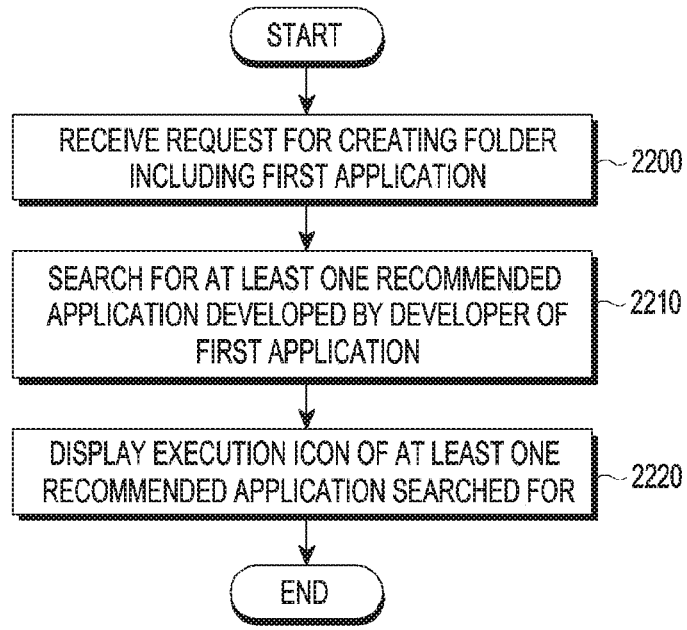
FIG. 22 is a flowchart illustrating operations for providing a recommended application based on developer information about a first application upon creating a folder including a first application according to various embodiments.

FIG. 22 is a flowchart illustrating operations for providing a recommended application based on developer information about a first application upon creating a folder including a first application according to various embodiments.

Referring to FIG. 22, in operation 2200, the electronic device 400 (e.g., the processor 410) may receive a request for creating a folder including a first application.

In operation 2210, the electronic device 400 (e.g., the processor 410) may search for at least one recommended application developed by the developer of the first application. For example, where the identified developer of the first application is "Samsung," the electronic device 400 (e.g., the processor 410) may search for at least one recommended application developed by "Samsung."

In operation 2220, the electronic device 400 (e.g., the processor 410) may display execution icons of at least one recommended application searched for.

Figure 23:
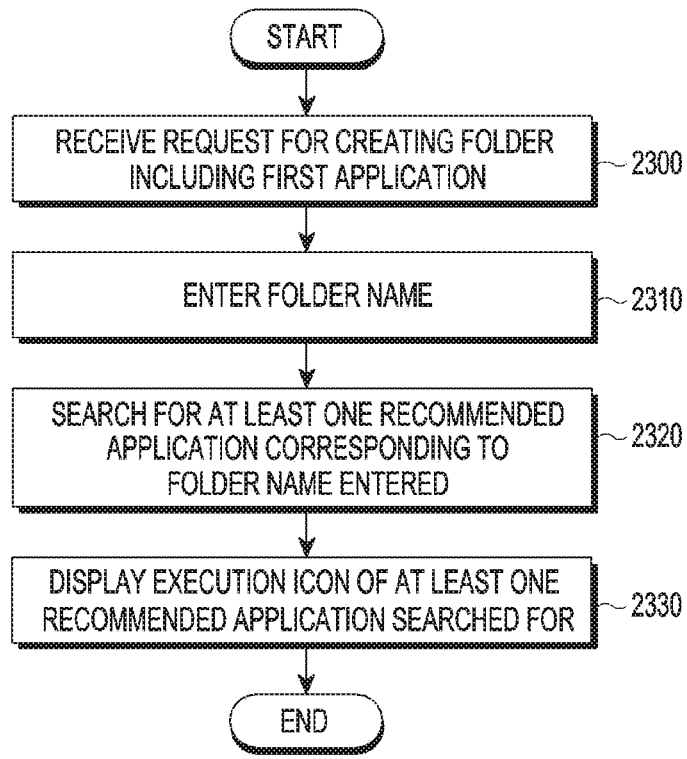
FIG. 23 is a flowchart illustrating operations for providing a recommended application based on a folder name entered upon creating a folder including a first application according to various embodiments.

FIG. 23 is a flowchart illustrating operations for providing a recommended application based on a folder name entered upon creating a folder including a first application according to various embodiments.

Referring to FIG. 23, in operation 2300, the electronic device 400 (e.g., the processor 410) may receive a request for creating a folder including a first application.

Upon entry of a folder name through the input device 420 in operation 2310, the electronic device 400 (e.g., the processor 410) may search for at least one recommended application corresponding to the folder name entered. For example, where the folder name entered is "movie," the electronic device 400 (e.g., the processor 410) may search for at least one recommended application with "movie" in their name, category name, description, or reviews.

In operation 2330, the electronic device 400 (e.g., the processor 410) may display execution icons of at least one recommended application searched for.

Figure 24A:
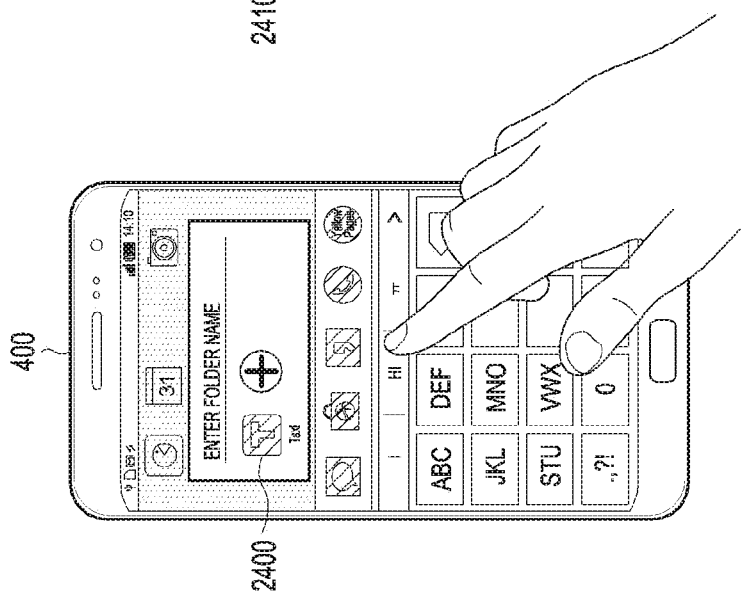
FIG. 24 illustrates examples of operations for providing a recommended application based on icon color, icon shape, or developer information about a first application upon creating a folder including the first application according to various embodiments.
Figure 24B:
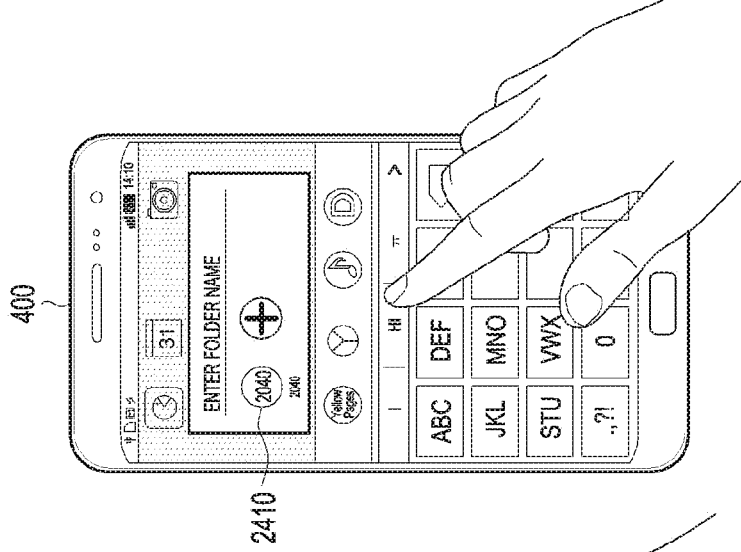
Figure 24C:
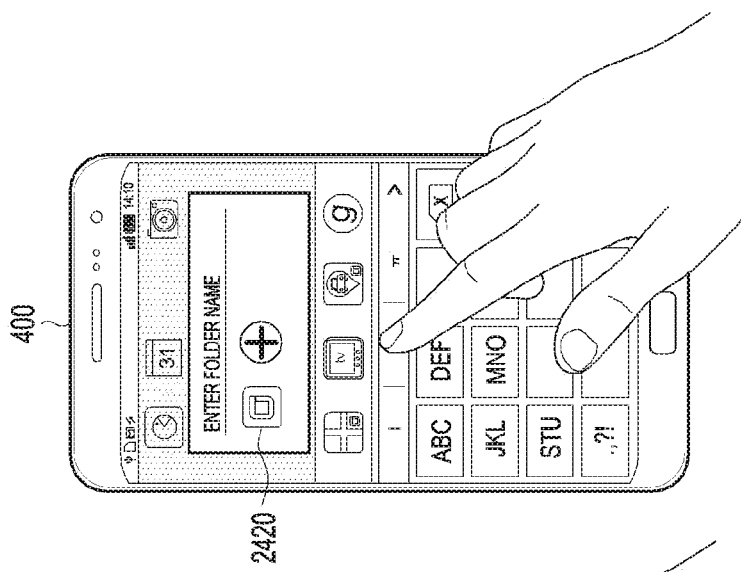

FIG. 24 illustrates examples of operations for providing a recommended application based on icon color, icon shape, or developer information about a first application upon creating a folder including the first application according to various embodiments.

Referring to FIG. 24, upon creating a folder including an execution icon 2400 of a first application as shown in (a) of FIG. 24, the electronic device 400 may search for at least one recommended application having the same execution icon color as the execution icon color of the first application and display execution icons for at least one recommended application searched for. For example, the electronic device 400 may compare a representative color value for execution icons of at least one application installed on the electronic device 400 with a representative color value for the execution icon of the first application and search for at least one recommended application for which the difference is less then a threshold.

Upon creating a folder including an execution icon 2410 of a second application as shown in (b) of FIG. 24, the electronic device 400 may search for at least one recommended application having the same execution icon shape as the execution icon shape of the third application and display execution icons for at least one recommended application searched for. For example, where the execution icon shape of the second application is "circle," the electronic device 400 may search for at least one recommended application whose execution icon shape is "circle" among at least one application installed on the electronic device 400.

Upon creating a folder including an execution icon 2420 of a third application as shown in (c) of FIG. 24, the electronic device 400 may search for at least one recommended application developed by the developer of the third application and display execution icons for at least one recommended application searched for. For example, where the developer of the third application is "Samsung," the electronic device 400 may search for at least one recommended application developed by "Samsung."

Figure 25:
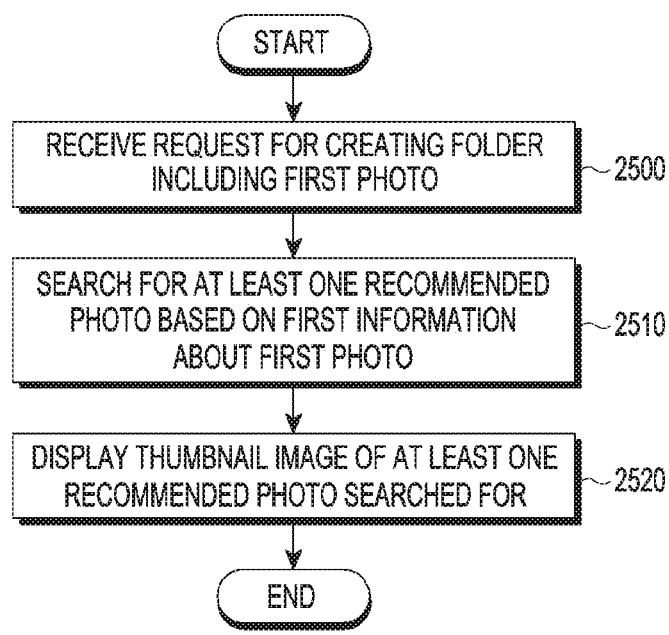
FIG. 25 is a flowchart illustrating operations for providing a recommended photo based on first information about a first photo upon creating a folder including the first photo according to various embodiments.

FIG. 25 is a flowchart illustrating operations for providing a recommended photo based on first information about a first photo upon creating a folder including the first photo according to various embodiments.

Referring to FIG. 25, in operation 2500, the electronic device 400 (e.g., the processor 410) may receive a request for creating a folder including a first photo.

In an embodiment, the electronic device 400 (e.g., the processor 410) may display a folder creation screen including the first photo.

In operation 2510, the electronic device 400 (e.g., the processor 410) may search for at least one recommended photo based on first information about the first photo.

For example, the electronic device 400 (e.g., the processor 410) may search for at least one recommended photo based on, e.g., the file name of the first photo, the created date of the first photo, location information measured upon creating the first photo, the background color of the first photo, and object information extractable and recognizable from the first photo.

Where the file name of the first photo is "Sky," the electronic device 400 (e.g., the processor 410) may search for at least one recommended photo with "Sky" in their file name.

Where the date of creation of the first photo is "2015-11-1," the electronic device 400 (e.g., the processor 410) may search for at least one recommended photo whose date of creation is "2015-11-1."

Where the location information obtained upon producing the first photo is "Company," the electronic device 400 (e.g., the processor 410) may search for at least one recommended photo whose location information is "Company."

Where the object information extractable or recognizable from the first photo is "Cat," the electronic device 400 (e.g., the processor 410) may search for at least one recommended photo whose object information is "Cat."

In operation 2520, the electronic device 400 (e.g., the processor 410) may display thumbnail images of at least one recommended application searched for.

Figure 26:
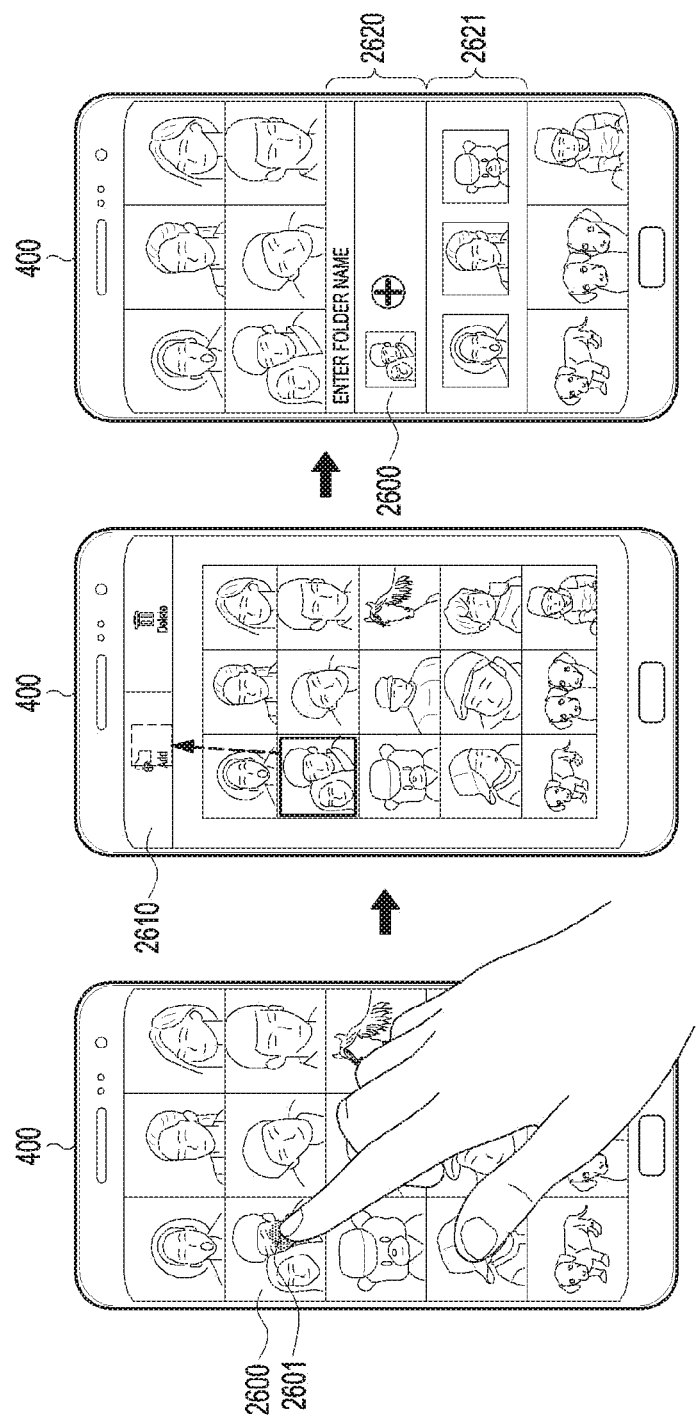
FIG. 26 illustrates examples of operations for providing a recommended photo based on first information about a first photo upon creating a folder including the first photo according to various embodiments.

FIG. 26 illustrates examples of operations for providing a recommended photo based on first information about a first photo upon creating a folder including the first photo according to various embodiments.

Referring to FIG. 26, the electronic device 400 (e.g., the processor 410) may display a photo gallery screen including thumbnail images for multiple photos as shown in (a) of FIG. 26.

Upon a long-touch input 2601 on the thumbnail image 2600 of a first photo, the electronic device 400 (e.g., the processor 410) may shrink the photo gallery screen as shown in (b) of FIG. 26 and produce a folder creation area 2610 at the top of the photo gallery screen, and if the long-touched thumbnail image 2600 of the first photo is dragged to the folder creation area 2610, the electronic device 400 (e.g., the processor 410) may search for at least one recommended photo based on first information about the first photo.

As shown in (c) of FIG. 26, the electronic device 400 (e.g., the processor 410) may display a folder creation screen 2620 including the thumbnail image 2600 of the first photo and display a recommended photo screen 2621 including thumbnail images of at least one recommended photo searched for under or at the bottom of the folder creation screen 2620.

For example, where the location information about the first photo selected is "Home," the electronic device 400 (e.g., the processor 410) may search for at least one recommended photo whose location information corresponds to "Home" and display thumbnail images of at least one recommended photo searched for.

Figure 27:
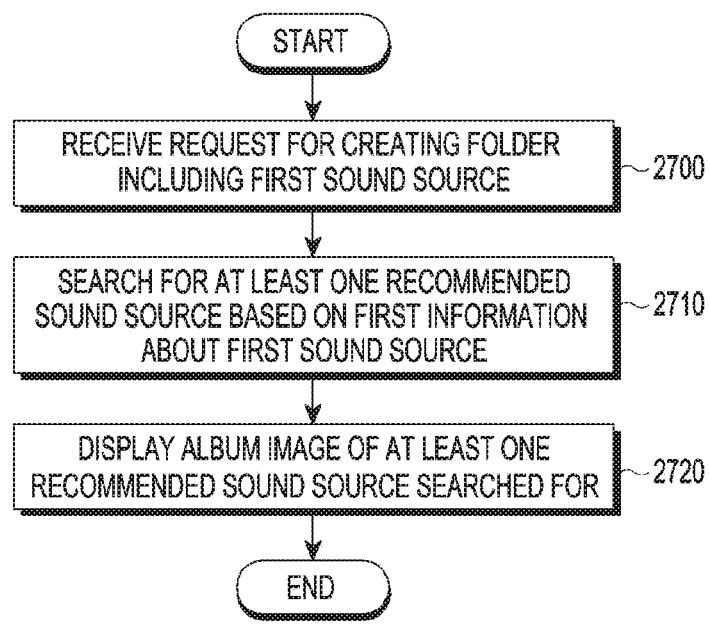
FIG. 27 is a flowchart illustrating operations for providing a recommended sound source based on first information about a first sound source upon creating a folder including the first sound source according to various embodiments.

FIG. 27 is a flowchart illustrating operations for providing a recommended sound source based on first information about a first sound source upon creating a folder including the first sound source according to various embodiments.

Referring to FIG. 27, in operation 2700, the electronic device 400 (e.g., the processor 410) may receive a request for creating a folder including a first sound source.

In operation 2710, the electronic device 400 (e.g., the processor 410) may search for at least one recommended sound source based on first information about the first sound source.

For example, the electronic device 400 (e.g., the processor 410) may search for at least one recommended sound source based on, e.g., the date of creation of the first sound source, composer, lyricist, or music arranger information about the first sound source, bitrate information about the first sound source, and sound source website information about the first sound source.

Where the date of creation of the first sound source is "2012-11-11," the electronic device 400 (e.g., the processor 410) may search for at least one recommended sound source whose date of creation is "2012-11-11."

Where the composer of the first sound source is "Bach," the electronic device 400 (e.g., the processor 410) may search for at least one recommended sound source whose composer is "Bach."

Where the bitrate information about the first sound source is "24 bits," the electronic device 400 (e.g., the processor 410) may search for at least one recommended sound source whose bitrate is 24 bits.

Where the sound source website information about the first sound source is "Samsung," the electronic device 400 (e.g., the processor 410) may search for at least one recommended whose sound source website information is "Samsung."

In operation 2720, the electronic device 400 (e.g., the processor 410) may display album images of at least one recommended sound source searched for.

Figure 28:
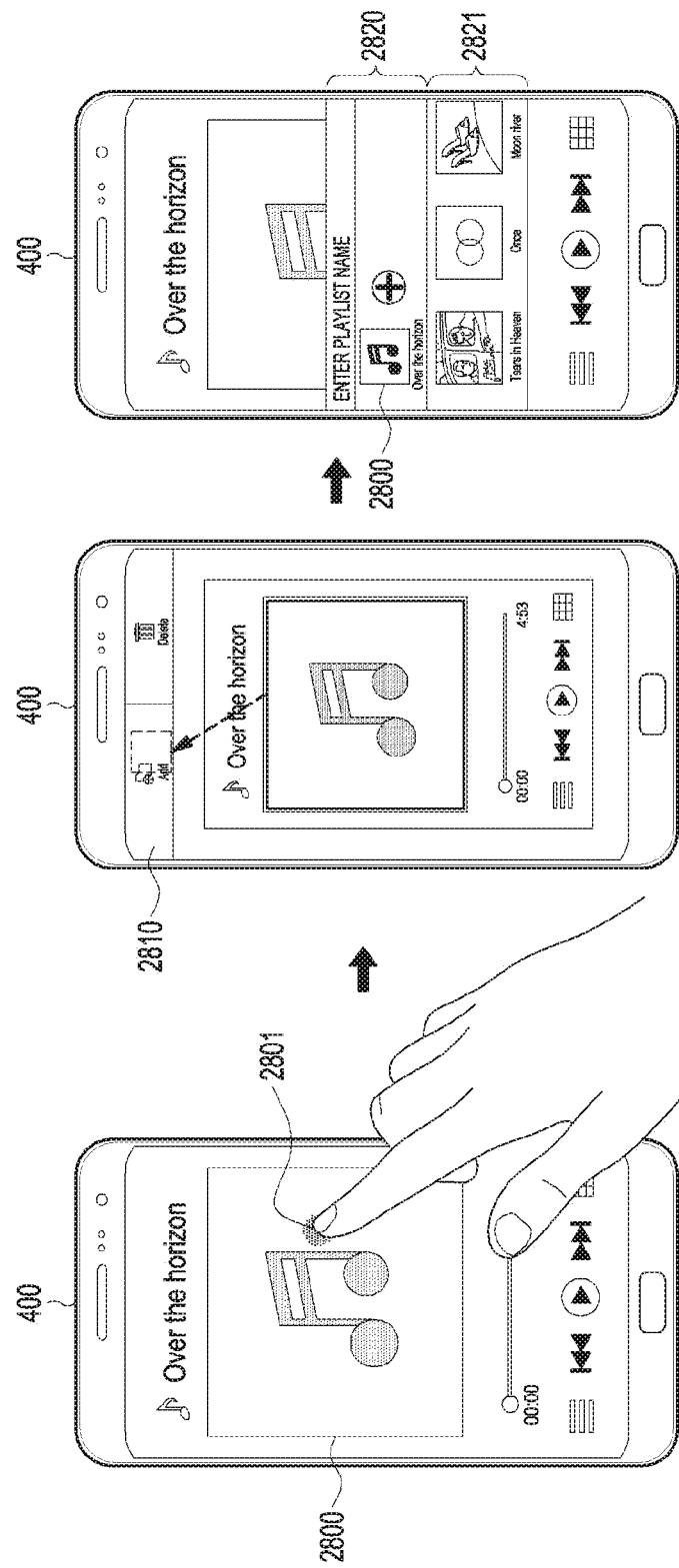
FIG. 28 illustrates examples of operations for providing a recommended sound source based on first information about a first sound source upon creating a folder including the first sound source according to various embodiments.

FIG. 28 illustrates examples of operations for providing a recommended sound source based on first information about a first sound source upon creating a folder including the first sound source according to various embodiments.

Referring to FIG. 28, the electronic device 400 (e.g., the processor 410) may display a playback screen for the first sound source as shown in (a) of FIG. 28. The playback screen for the first sound source may include, e.g., the name, album image, time line, and play button of the first sound source.

Upon a long-touch input 2801 on the album image 2800 of the first photo, the electronic device 400 (e.g., the processor 410) may shrink the playback screen as shown in (b) of FIG. 28 and produce a folder creation area 2810 at the top of the playback screen, and if the long-touched album image 2800 of the first sound source is dragged to the folder creation area 2810, the electronic device 400 (e.g., the processor 410) may search for at least one recommended sound source based on first information about the first sound source.

As shown in (c) of FIG. 28, the electronic device 400 (e.g., the processor 410) may display a folder creation screen 2820 including the album image of the first sound source and display a recommended sound source screen 2821 including album images of at least one recommended sound source searched for under or at the bottom of the folder creation screen 2820.

For example, where the location information about the first photo selected is "Home," the electronic device 400 (e.g., the processor 410) may search for at least one recommended photo whose location information corresponds to "Home" and display thumbnail images of at least one recommended photo searched for.

For example, where the date of creation of the first sound source is "2013-10-25," the electronic device 400 (e.g., the processor 410) may search for at least one recommended sound source whose date of creation corresponds to "2013-10-25" and display album images for at least one recommended sound source searched for.

Figure 29:
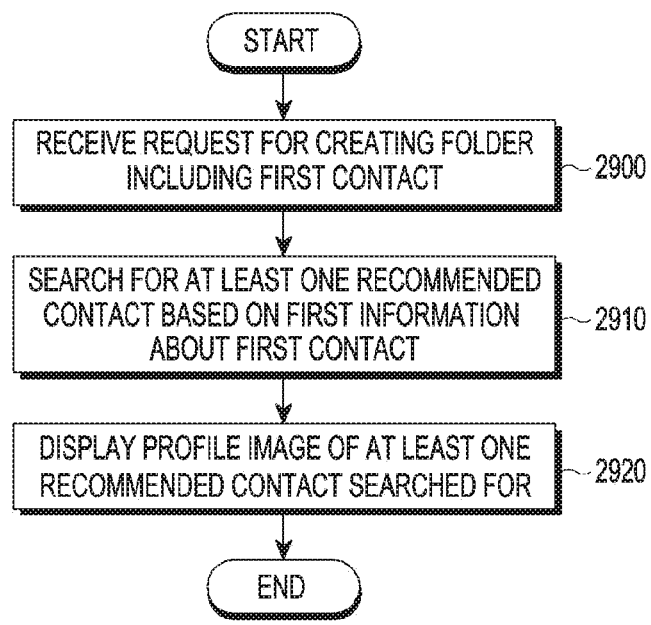
FIG. 29 is a flowchart illustrating operations for providing a recommended contact based on first information about a first contact upon creating a folder including the first contact according to various embodiments.

FIG. 29 is a flowchart illustrating operations for providing a recommended contact based on first information about a first contact upon creating a folder including the first contact according to various embodiments.

Referring to FIG. 29, in operation 2900, the electronic device 400 (e.g., the processor 410) may receive a request for creating a folder including a first contact.

In operation 2910, the electronic device 400 (e.g., the processor 410) may search for at least one recommended contact based on first information about the first contact.

For example, the electronic device 400 (e.g., the processor 410) may search for at least one recommended sound source based on, e.g., the workplace information, address information, SNS use information, email information, title or nickname information of the first contact.

Where the workplace information of the first contact is "Samsung," the electronic device 400 (e.g., the processor 410) may search for at least one recommended contact whose workplace information is "Samsung."

Where the address information of the first contact is "Seongnam-si, Gyeonggi-do," the electronic device 400 (e.g., the processor 410) may search for at least one recommended contact whose address information is "Seongnam-si, Gyeonggi-do."

Where the SNS use information of the first contact is "Twitter ID," the electronic device 400 (e.g., the processor 410) may search for at least one recommended contact whose SNS use information is "Twitter ID."

Where the email information of the first contact is "Gmail," the electronic device 400 (e.g., the processor 410) may search for at least one recommended contact whose email information is "Gmail."

Where the title information of the first contact is "Manager," the electronic device 400 (e.g., the processor 410) may search for at least one recommended contact whose title information is "Manager."

Where the nickname information of the first contact is "Rabbit," the electronic device 400 (e.g., the processor 410) may search for at least one recommended contact whose nickname information is "Rabbit."

In operation 2920, the electronic device 400 (e.g., the processor 410) may display profile images of at least one recommended contact searched for.

FIG. 30 illustrates examples of operations for providing a recommended contact based on first information about a first contact upon creating a folder including the first contact according to various embodiments.

Referring to FIG. 30, the electronic device 400 (e.g., the processor 410) may display a contacts list screen including multiple contacts as shown in (a) of FIG. 30. The contacts list screen may include contacts for a plurality of users stored in the electronic device 400.

Upon a long-touch input 3001 on a first contact 3000, the electronic device 400 (e.g., the processor 410) may shrink the contacts list screen as shown in (b) of FIG. 30 and produce a folder creation area 3010 at the top of the contacts list screen, and if the long-touched first contact 3000 is dragged to the folder creation area 3010, the electronic device 400 (e.g., the processor 410) may search for at least one recommended contact based on first information about the first contact.

As shown in (c) of FIG. 30, the electronic device 400 (e.g., the processor 410) may display a folder creation screen 3030 including the profile image 3020 of the first contact and display a recommended profile screen 3031 including profile images of at least one recommended contact searched for under or at the bottom of the folder creation screen 3030.

For example, where the address information of the first contact is "My home," the electronic device 400 (e.g., the processor 410) may search for at least one recommended contact whose address information is "My home" and display profile photos for at least one recommended contact searched for.

As such, according to various embodiments of the present invention, upon creating a folder containing a first object, at least one recommended object related to the first object may be provided, allowing the user to create a folder for objects in an easier and more convenient way.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to various embodiments, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic media (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out various embodiments, and vice versa.

Modules or programming modules in accordance with various embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present invention. Accordingly, the scope of the present invention should be interpreted as including all changes or various embodiments based on the technical spirit of the present invention.

The invention claimed is:

1. An electronic device, comprising:
a touch screen display; and
a processor configured to:
control the touch screen display to display an execution screen of a first application including one or more images among a plurality of images stored in the electronic device, the execution screen of the first application being displayed in a first size and the one or more images being displayed in a second size,
receive, by using the touch screen display, a first touch input on a first image from among the one or more images included in the execution screen of the first application, in response to receiving the first touch input, control the touch screen display to display the one or more images in a third size smaller than the second size on the execution screen of the first application and display a first user interface not to overlap the execution screen of the first application, the execution screen of the first application being displayed in a fourth size smaller than the first size while the first touch input is received, receive, by using the touch screen display, a second touch input for dragging the first image to the first user interface, in response to receiving the second touch input, identify one or more recommended images from among the plurality of images based on first information associated with the first image, and control the touch screen display to display the one or more images in the second size, a second user interface including the first image and a third user interface including the one or more recommended images, on the execution screen of the first application, the first information including a date when the first image is obtained, location information of the electronic device when the first image is obtained, a color of the first image, and an object included in the first image, the second user interface and the third user interface being displayed to at least partially overlap the execution screen of the first application, and based on the first image being dragged to the first interface, the execution screen of the first application being displayed in the first size, receive, by using the touch screen display, a third touch input for selecting at least one recommended image from among the one or more recommended images, and in response to receiving the third touch input for selecting the at least one recommended image, control the touch screen display to display a folder including the first image and the at least one recommended image selected from among the one or more recommended images.

2. The electronic device of claim 1, further comprising a memory configured to store the plurality of images.

3. A method for providing a recommended image by an electronic device, the method comprising:

displaying, through a touch screen display of the electronic device, an execution screen of a first application including one or more images among a plurality of images stored in the electronic device, the execution screen of the first application being displayed in a first size and the one or more images are displayed in a second size;

receiving, by using the touch screen display, a first touch input on a first image from among the one or more images included in the execution screen of the first application;

in response to receiving the first touch input, displaying, through the touch screen display, the one or more images in a third size smaller than the second size on the execution screen of the first application and displaying a first user interface not to overlap the execution screen of the first application, the execution screen of the first application being displayed in a fourth size smaller than the first size while the first touch input is received;

receiving, by using the touch screen display, a second touch input for dragging the first image to the first user interface;

in response to receiving the second touch input, identifying one or more recommended images from among the plurality of images based on first information associated with the first image, and displaying, through the touch screen display, the one or more images in the second size, a second user interface including the first image and a third user interface including the one or more recommended images, on the execution screen of the first application, the first information including a date when the first image is obtained, location information of the electronic device when the first image is obtained, a color of the first image, and an object included in the first image, the second user interface and the third user interface being displayed to at least partially overlap the execution screen of the first application, and based on the first image being dragged to the first interface, the execution screen of the first application being displayed in the first size;

receiving, by using the touch screen display, a third touch input for selecting at least one recommended image from among the one or more recommended images; and in response to receiving the third touch input for selecting the at least one recommended image, displaying, through the touch screen display, a folder including the first image and the at least one recommended image selected from among the one or more recommended images.

4. A non-transitory computer-readable storage medium storing commands, the commands configured to be executed by at least one processor to cause the at least one processor to perform at least one operation, the at least one operation comprising:

displaying, through a touch screen display of an electronic device, an execution screen of a first application including one or more images among a plurality of images stored in the electronic device, the execution screen of the first application being displayed in a first size and the one or more images are displayed in a second size;

receiving, by using the touch screen display, a first touch input for selecting a first image from among the one or more images included in the execution screen of the first application;

in response to receiving the first touch input, displaying, through the touch screen display, the one or more images in a third size smaller than the second size on the execution screen of the first application and displaying a first user interface not to overlap the execution screen of the first application, the execution screen of the first application being displayed in a fourth size smaller than the first size while the first touch input is received;

receiving, by using the touch screen display, a second touch input for dragging the first image to the first user interface;

in response to receiving the second touch input, identifying one or more recommended images from among the plurality of images based on first information associated with the first image and displaying, through the touch screen display, the one or more images in the second size, a second user interface including the first image and a third user interface including the one or more recommended images, on the execution screen of the first application, the first information including a date when the first image is obtained, location information of the electronic device when the first image is obtained, a color of the first image, and an object included in the first image, the second user interface and the third user interface being displayed to at least partially overlap the execution screen of the first application, and based on the first image being dragged to the first interface, the execution screen of the first application being displayed in the first size;

receiving, by using the touch screen display, a third touch input for selecting at least one recommended image from among the one or more recommended images; and in response to receiving the third touch input for selecting the at least one recommended image, displaying, through the touch screen display, a folder including the first image and the at least one recommended image selected from among the one or more recommended images.

\* \* \* \* \*